United States Patent
Kim et al.

(10) Patent No.: US 11,578,192 B2
(45) Date of Patent: Feb. 14, 2023

(54) MOLDED ARTICLE

(71) Applicant: Furukawa Electric Co., Ltd., Tokyo (JP)

(72) Inventors: Jaekyung Kim, Tokyo (JP); Kenichi Suyama, Tokyo (JP); Yasuo Nakajima, Tokyo (JP); Eiji Kozawa, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 16/832,986

(22) Filed: Mar. 27, 2020

(65) Prior Publication Data

US 2020/0224007 A1    Jul. 16, 2020

Related U.S. Application Data

(63) Continuation of application No. PCT/JP2018/036582, filed on Sep. 28, 2018.

(30) Foreign Application Priority Data

Sep. 29, 2017   (JP) .............................. JP2017-190812
Sep. 29, 2017   (JP) .............................. JP2017-190813
(Continued)

(51) Int. Cl.
   *C08L 1/02*      (2006.01)
   *C08K 3/017*    (2018.01)
   (Continued)

(52) U.S. Cl.
   CPC ................ *C08L 1/02* (2013.01); *C08K 3/017* (2018.01); *C08L 101/025* (2013.01);
   (Continued)

(58) Field of Classification Search
   CPC ........ C08L 1/02; C08L 101/025; C08L 51/06; C08K 3/017
   See application file for complete search history.

(56) References Cited

U.S. PATENT DOCUMENTS 3,464,952 A   9/1969   Larsen
3,645,939 A   2/1972   Gaylord
(Continued)

FOREIGN PATENT DOCUMENTS

CN   101896551 A   11/2010
CN   102040831 A   5/2011
(Continued)

OTHER PUBLICATIONS

English-language machine translation of JP201207063, performed on Espacenet on Sep. 1, 2021, 14 pages.*
(Continued)

*Primary Examiner* — Liam J Heincer
(74) *Attorney, Agent, or Firm* — Dorsey & Whitney LLP

(57) ABSTRACT

The present disclosure relates to a molded article provided with a resin part formed with a thermoplastic resin composition. The molded article is provided with a resin part formed with a thermoplastic resin composition. The thermoplastic resin composition containing a thermoplastic resin, cellulose, and an ionic compound, wherein a content of the cellulose is 1 to 100 parts by mass based on 100 parts by mass of the thermoplastic resin, and a content of the ionic compound is 0.001 times or more and less than 1.000 times the content of the cellulose.

7 Claims, 6 Drawing Sheets

(30) Foreign Application Priority Data

| Sep. 29, 2017 | (JP) | JP2017-190815 |
|---|---|---|
| Sep. 29, 2017 | (JP) | JP2017-190816 |
| Oct. 31, 2017 | (JP) | JP2017-210340 |
| May 22, 2018 | (JP) | JP2018-098147 |

(51) Int. Cl.

| *C08L 101/02* | (2006.01) |
|---|---|
| *H01R 13/504* | (2006.01) |
| *C08L 51/06* | (2006.01) |
| *F21V 15/01* | (2006.01) |

(52) U.S. Cl.
 CPC .......... *C08L 51/06* (2013.01); *F21V 15/01* (2013.01); *H01R 13/504* (2013.01)

(56) References Cited

U.S. PATENT DOCUMENTS

| 3,856,724 A | 12/1974 | O Connor et al. |
|---|---|---|
| 3,962,157 A | 6/1976 | Nakano et al. |
| 4,380,522 A | 4/1983 | Georlette et al. |
| 2003/0157351 A1 | 8/2003 | Swatloski et al. |
| 2004/0214925 A1 | 10/2004 | Sigworth |
| 2005/0288484 A1* | 12/2005 | Holbrey ............ C08L 33/20 528/480 |
| 2007/0141337 A1 | 6/2007 | Mehta et al. |
| 2007/0208110 A1 | 9/2007 | Sigworth et al. |
| 2008/0146701 A1 | 6/2008 | Sain et al. |
| 2008/0188636 A1 | 8/2008 | Argyropoulos et al. |
| 2010/0267942 A1 | 10/2010 | Buchanan et al. |
| 2010/0292381 A1 | 11/2010 | Kamikawa |
| 2010/0305249 A1 | 12/2010 | Buchanan et al. |
| 2011/0086948 A1 | 4/2011 | Han et al. |
| 2011/0244217 A1 | 10/2011 | Matsushita |
| 2011/0244223 A1 | 10/2011 | Matsushita |
| 2012/0041080 A1 | 2/2012 | Buchanan et al. |
| 2012/0121830 A1 | 5/2012 | Buchanan et al. |
| 2012/0214911 A1 | 8/2012 | Yano et al. |
| 2012/0225976 A1 | 9/2012 | Bampi |
| 2014/0073776 A1 | 3/2014 | Shiramizu et al. |
| 2014/0121307 A1 | 5/2014 | Cao et al. |
| 2014/0227605 A1 | 8/2014 | Nakamura et al. |
| 2014/0336309 A1* | 11/2014 | Sakata ............. C08K 7/02 524/35 |
| 2014/0343271 A1 | 11/2014 | Buchanan et al. |
| 2014/0350188 A1* | 11/2014 | Hamad ............ C08L 51/02 525/190 |
| 2015/0105499 A1 | 4/2015 | Yano et al. |
| 2016/0002461 A1 | 1/2016 | Tsujii et al. |
| 2016/0075877 A1 | 3/2016 | Kaiser |
| 2016/0229997 A1 | 8/2016 | Mohanty et al. |
| 2016/0289375 A1* | 10/2016 | Nakamura ............ C08L 23/12 |
| 2017/0002182 A1* | 1/2017 | Imai ................ C08L 1/02 |
| 2017/0218188 A1* | 8/2017 | Kozawa ............ B32B 27/08 |
| 2019/0023877 A1 | 1/2019 | Kozawa et al. |
| 2019/0023882 A1 | 1/2019 | Kim et al. |
| 2019/0031858 A1 | 1/2019 | Kozawa et al. |
| 2020/0010654 A1 | 1/2020 | Kim et al. |
| 2020/0224008 A1* | 7/2020 | Kim ................ A01G 9/16 |
| 2020/0224009 A1 | 7/2020 | Kim et al. |
| 2020/0255630 A1 | 8/2020 | Kim et al. |

FOREIGN PATENT DOCUMENTS

| CN | 103534275 A | 1/2014 |
|---|---|---|
| CN | 104292412 A | 1/2015 |
| CN | 104334615 A | 2/2015 |
| EP | 0822223 A1 | 2/1998 |
| EP | 0897943 A2 | 2/1999 |
| EP | 2268857 A1 | 1/2011 |
| EP | 2419453 A1 | 2/2012 |
| EP | 2419454 A1 | 2/2012 |
| EP | 2492305 A1 | 8/2012 |
| EP | 2268857 B1 | 9/2012 |
| EP | 3216806 A1 | 9/2017 |
| EP | 3604424 A1 | 2/2020 |
| EP | 3689972 A1 | 8/2020 |
| JP | S55131031 A | 10/1980 |
| JP | S6239642 A | 2/1987 |
| JP | S6333448 A | 2/1988 |
| JP | H08267597 A | 10/1996 |
| JP | H09316248 A | 12/1997 |
| JP | H101575 A | 1/1998 |
| JP | H11217468 A | 8/1999 |
| JP | 2000264974 A | 9/2000 |
| JP | 3479661 B2 | 12/2003 |
| JP | 2005187524 A | 7/2005 |
| JP | 4013870 B2 | 11/2007 |
| JP | 2008297364 A | 12/2008 |
| JP | 2009167250 A | 7/2009 |
| JP | 2010089483 A | 4/2010 |
| JP | 2011093990 A | 5/2011 |
| JP | 2011116838 A | 6/2011 |
| JP | 2011213966 A | 10/2011 |
| JP | 2011219571 A | 11/2011 |
| JP | 2012087199 A | 5/2012 |
| JP | 2012102324 A | 5/2012 |
| JP | 2012207063 A | 10/2012 |
| JP | 2012524145 A | 10/2012 |
| JP | 2012214563 A | 11/2012 |
| JP | 2012236906 A | 12/2012 |
| JP | 2013056958 A | 3/2013 |
| JP | 2013107987 A | 6/2013 |
| JP | 2013189574 A | 9/2013 |
| JP | 2013234268 A | 11/2013 |
| JP | 2013248824 A | 12/2013 |
| JP | 2014001361 A | 1/2014 |
| JP | 2014129509 A | 7/2014 |
| JP | 2014193959 A | 10/2014 |
| JP | 2015050052 A | 3/2015 |
| JP | 2015183153 A | 10/2015 |
| JP | 2015203093 A | 11/2015 |
| JP | 2015209439 A | 11/2015 |
| JP | 2016017096 A | 2/2016 |
| JP | 2016094516 A | 5/2016 |
| JP | 2017128717 A | 7/2017 |
| JP | 2017145392 A | 8/2017 |
| JP | 2017145393 A | 8/2017 |
| JP | 2017155248 A | 9/2017 |
| JP | 2017171698 A | 9/2017 |
| KR | 20100129293 A | 12/2010 |
| WO | 03029329 A2 | 4/2003 |
| WO | 2008069121 A1 | 6/2008 |
| WO | 2009118262 A1 | 10/2009 |
| WO | 2010120269 A1 | 10/2010 |
| WO | 2013035786 A1 | 3/2013 |
| WO | 2013133093 A1 | 9/2013 |
| WO | 2015039237 A1 | 3/2015 |
| WO | 2015152189 A1 | 10/2015 |
| WO | WO-2016063914 A1 * | 4/2016 ............ C08L 23/12 |
| WO | 2015053226 A1 | 3/2017 |
| WO | 2017141779 A1 | 8/2017 |
| WO | 2017165957 A1 | 10/2017 |
| WO | 2017170745 A1 | 10/2017 |
| WO | 2017170746 A1 | 10/2017 |
| WO | 2017170747 A1 | 10/2017 |

OTHER PUBLICATIONS

Juliusz Pernak et al., "New Ionic Liquids and Their Antielectrostatic Properties," 40 Ind. Eng. Chem. Res. 2379-83 (2001) (Year: 2001).*

English translation of International Preliminary Report on Patentability for Application No. PCT/JP2018/036582, dated Mar. 31, 2020.

English translation of International Search Report and Written Opinion for Application No. PCT/JP2018/036582, dated Nov. 20, 2018.

English translation of Written Opinion for Application No. PCT/JP2018/036582, dated Nov. 20, 2018.

(56) References Cited

OTHER PUBLICATIONS

Brintzinger, Hans H. et al., "Stereospecific Olefin Polymerization with Chiral Metallocene Catalysts", Angewandte Chemie International Edition in English, vol. 34, Issue 11, Jun. 16, 1995, 1143-1170.
Ewen, John et al., "Syndiospecific Propylene Polymerizations With Group 4 Metallocenes", Journal of the American Chemical Society, vol. 110 No. 18, Aug. 1, 1988, 6255.
Wahlström, Ronny et al., "Enzymatic Hydrolysis of Lignocellulosic Polysaccharides in the Presence of Ionic Liquids", Green Chemistry, vol. 17, Nov. 7, 2014, 694-714.
Yamashita, Shinzo et al., Handbook of Crosslinking Agent, Oct. 1981, 162.
Zambelli, A. et al., "Model Compounds and 13C NMR Observation of Stereosequences of Polypropylene", Macromolecules vol. 8 No. 5, Sep. 1, 1975, 687.
Extended European Search Report for EP Application No. 18860137.1, dated Jun. 4, 2021.
Ota, , English-language machine translation of JP2005187524A ("Ota"), performed on Espacenet on Apr. 20, 2021, 11 pages, 11 pages.
Suzuki, Katsuhito et al., "Development of continuous process enabling nanofibrillation of pulp and melt compounding", Cellulose, Springer Netherlands, Netherlands, vol. 20, No. 1, Feb. 1, 2013, (Feb. 1, 2013), pp. 201-210, XP036830877.
English translation of Office Action for CN Application No. 201880063823.5, dated Jul. 5, 2021.
Satas, D. et al., "Coatings Technology Handbook (Second Edition)", China Petrochemical Press, Jan. 2003, 9 pgs.
[English Translation] Decision of Rejection dated Mar. 25, 2021 for Chinese Application No. 201780017841.5.
[English Translation] First Office Action dated Aug. 26, 2020 for Chinese Application No. 201780018439.9.
[English Translation] First Office Action dated Jan. 19, 2022 for Chinese Patent Application No. 201880070847.3.
[English Translation] First Office Action dated Jun. 11, 2021 for the Chinese Patent Application No. 201880009893.2.
[English Translation] International Search Report dated Jul. 4, 2017 for PCT Application No. PCT/JP2017/013024.
[English Translation] International Search Report dated Jun. 12, 2018 for International Patent Application No. PCT/JP2018/009757.
[English Translation] International Search Report dated Jun. 27, 2017 for PCT Application No. PCT/JP2017/013022.
[English Translation] Notice of Reasons for Refusal dated Feb. 9, 2021 for Japanese Patent Application No. 2018-509368.
[English Translation] Notice of Reasons for Refusal dated Feb. 9, 2021 for Japanese Patent Application No. 2018-509370.
[English Translation] Notice of Reasons for Refusal dated Sep. 14, 2021 for Japanese Patent Application No. 2019-509210.
[English Translation] Second Office Action dated Jan. 30, 2022 for Chinese Patent Application No. 201880063825.4.
[English Translation] Second Office Action dated Jun. 3, 2021 for Chinese Patent Application No. 201780018439.9.
[English Translation] Second Office Action dated Oct. 13, 2021 for Chinese Patent Application No. 201880009893.2.
[English Translation] The First Office Action dated Jul. 3, 2020 for Chinese Application No. 201780017841.5.
[English Translation] The Second Office Action dated Dec. 10, 2020 for Chinese Application No. 201780017841.5.
Extended European Search Report dated Nov. 29, 2019 for European Patent Application No. 17775281.3.
Extended European Search Report dated Nov. 23, 2020 for European Patent Application No. 18776773.6.
Extended European Search Report dated Oct. 8, 2019 for European Patent Application No. EP17775279.7.
Extended European Search Report dated Sep. 15, 2020 for European Patent Application No. 20170209.9.
Final Rejection for U.S. Appl. No. 16/144,304, dated Jan. 7, 2022.
Non-Final Office Action for U.S. Appl. No. 16/144,304, dated Jun. 24, 2021.
[English Translation] Second Office Action dated Jan. 24, 2022 for Chinese Patent Application No. 201880063819.9, pp. all.
[English Translation] Second Office Action dated Jan. 29, 2022 for Chinese Patent Application No. 201880063823.5, pp. all.
[English Translation] Duan, Jiufang "Natural Polymeric Materials", Wuhan: Huazhong University of Science and Technology Press; ISBN 978-7-5680-1309-3, Jun. 2011, pp. all.
[English Translation] Wang, Guoquan "Principles and Applications of Polymer Blend Modification", Beijing: China Light Industry Press ISBN 978-7-5019-5741-5, Jul. 2007, pp. all.
[English Translation] Notice of Reasons for Refusal dated May 30, 2022 for Japanese Patent Application No. 2019-545198; pp. all.
Decision of Rejection for CN Application No. 201880009893.2, dated Jan. 18, 2022; pp. all [English Translation].
Non Final Rejection Action dated Mar. 15, 2022 for U.S. Appl. No. 16/833,222; pp. all.
Non Final Office Action issued in U.S. Appl. No. 16/144,304 dated Apr. 28, 2022; pp. all.
Non Final Office Action issued in U.S. Appl. No. 16/144,430, dated Apr. 28, 2022; pp. all.
The Editors of Encyclopaedia Britannica, "Kraft Process", Encyclopedia Britannica, Sep. 7, 2015, https://www.britannica.com/technology/kraft-process; captured Apr. 23, 2022; pp. all.
Communication pursuant to Rule 114(2) EPC with annexed third party observations under Article 115 EPC dated Apr. 12, 2022 for European Patent Application No. 18860626.3.
[English Translation] Second Office Action dated Jun. 7, 2022 for Chinese Patent Application No. 201880070847.3; pp. all.
[English Translation] Notice of Reasons for Refusal dated Jun. 28, 2022 for Japanese Patent Application No. 2019-550436; pp. all.
[English Translation] Notice of Submission of Publications and Reasons for Submission dated Apr. 15, 2022 for Japanese Patent Application No. 2019-545199; pp. all.
[English Translation] Notice of Reasons for Refusal dated Jul. 13, 2022 for Japanese Patent Application No. 2019-545199.
[English Translation] Notice of Reasons for Refusal dated Jul. 13, 2022 for Japanese Patent Application No. 2019-545200.
[English Translation] Rejection Decision dated Jul. 1, 2022 for Chinese Patent Application No. 201880063819.9.
[English Translation] Rejection Decision dated Jul. 1, 2022 for Chinese Patent Application No. 201880063823.5.
[English Translation] Rejection Decision dated Jul. 1, 2022 for Chinese Patent Application No. 201880063825.4.
[English Translation] Third Office Action dated Aug. 31, 2022 for CN application No. 201880070847.3; pp. all.
[English Translation] Notice of Reasons for Refusal for Japanese Patent Application No. 2019-545198 dated Nov. 8, 2022, pp. all.
[English Translation] Nippon Paper Group Website "Products Functional cellulose KC FLOCK(R) (Powdered Cellulose), NP fibers (plant fibers)" http://www.nipponpapergroup.com/products/chemical/functional_cellulose/kcflock.html, pp. all.
[English Translation] Notice of Reasons for Refusal for Japanese Patent Application No. 2019-550436 dated Dec. 13, 2022.
[English Translation] Notice of Submission of Publication and Reasons for Submission for Japanese Patent Application No. 2019-550436 dated Dec. 1, 2022, pp. all.

* cited by examiner

MOLDED ARTICLE

CROSS REFERENCE TO RELATED APPLICATIONS

This is a continuation application of International Patent Application No. PCT/JP2018/036582 filed Sep. 28, 2018, which claims the benefits of Japanese Patent Applications No. 2017-190812 filed Sep. 29, 2017, No. 2017-190813 filed Sep. 29, 2017, No. 2017-190815 filed Sep. 29, 2017, No. 2017-190816 filed Sep. 29, 2017, No. 2017-210340 filed Oct. 31, 2017, No. 2018-098147 filed May 22, 2018 and the full contents of all of which are hereby incorporated by reference in their entirety.

BACKGROUND

Technical Field

The present disclosure relates to a molded article, such as a lamp body of a lighting appliance, a speaker unit, a connection box, a connector, a pulley, and a film for a house, the molded article being provided with a resin part, and particularly relates to a molded article provided with a resin part prepared by injection molding, T-die molding, or the like. In particular, the present disclosure relates to a molded article, such as a lamp body of a lighting appliance, a speaker unit, a connection box, a connector, a pulley, and a film for a house, the molded article being provided with a resin part formed with a thermoplastic resin composition containing: cellulose, plant-derived fibrous cellulose in particular; and an ionic compound.

Description of the Related Art

In recent years, for the purpose of reducing fuel consumption of a vehicle, such as an automobile, further weight reduction of the vehicle has been required. To reduce the weight of a vehicle, not only the weight of a large part, such as a body forming the vehicle, but also the weights of various members, such as a lighting appliance including a headlight or the like, a speaker unit for automotive application as one component of an audio system to be loaded on the vehicle, a connection box and a connector for an automobile, and a guide pulley for a belt that drives engine accessories or the like of an automobile, need to be reduced.

The lighting appliance for a vehicle is generally provided with a lamp body including an opening, a front cover that covers the opening, an extension, a reflection mirror (reflector), a light source, electrical components, and the like. To reduce the weight of the lighting appliance for a vehicle, it is effective to form the lamp body with a resin material, the lamp body having a relatively high ratio of the weight to the total weight of the lighting appliance for a vehicle among the components of the lighting appliance for a vehicle.

In addition to further weight reduction, improvements in strength characteristics against vibration and in acoustic characteristics as a speaker unit are also required in the speaker unit for automotive application. To meet such requirements, it is desirable to form, for example, a case body (enclosure or cabinet), a frame, and the like of the speaker unit with a suitable compounded material.

The connection box and connector for an automobile is generally produced by performing injection molding using a glass fiber-reinforced thermoplastic resin composition in which a glass fiber is dispersed as a reinforcing material. The use of such a highly strong resin enables thinning and weight reduction of the connection box and the connector. On the other hand, when the connection box, the connector, and the like are produced by injection molding, runner end materials and mis-shot products are produced. In addition, connection boxes, connectors, and the like formed using a glass fiber-reinforced thermoplastic resin are collected from scrapped cars in some cases. However, deterioration in strength of a recycled glass fiber-reinforced thermoplastic resin due to recycling is significant. Therefore, when a recycled glass fiber-reinforced thermoplastic resin is used, thinning and weight reduction of a connection box, a connector, and the like are difficult from the viewpoint of retaining the strength. Thus, a fiber-reinforced material such that effects of thinning and weight reduction are not lost even if it is recycled, the fiber-reinforced material being excellent in recyclability, is desired.

In a pulley for a vehicle, a resin part is in general integrally molded along the outer periphery of a rolling bearing, and the resin part is formed by injection molding using a resin or the like containing a reinforced fiber from the viewpoint of productivity. However, in the case of the injection molding, a gate for adjusting the inlet velocity of a resin material is essential for an injection molding machine. In addition, at a part where the resin materials having flown from the gate into a metal mold join, a weld is produced to generate nonuniformity of the reinforced fiber in a circumferential direction, so that there is a possibility that unevenness in strength and size accuracy occurs. Therefore, when a pulley is produced by injection molding, the size accuracy of the outer peripheral portion, which guides a belt, in the resin part, the strength characteristics and the like to endure the tension of the belt are required. Being excellent in size accuracy is also required similarly in the lamp body.

Such weight reduction and improvements in strength characteristics of various molded members are also required in, for example, molded members, for a house for agriculture, not limited to members for a vehicle, such as an automobile. The house for agriculture is widely used for the purpose of protecting products in the house from the outside and retaining a constant environment. A transparent film using as the main raw material vinyl chloride, polyethylene, a polyethylene-vinyl acetate copolymer, polyethylene terephthalate (PET), a polyethylene-tetrafluoroethylene copolymer, or the like is mainly used as a film for a house for agriculture so that situation of the inside can be grasped to a certain extent from the outside. Further, in recent years, the scale of an agricultural house has been made large in some cases from the viewpoint such as improving productivity. In a large-scale house for agriculture, the weight of the film to be used for the house increases, making an influence on the skeleton that supports the whole house large. In addition, an area where a flying object from the outside contacts increases. Therefore, weight reduction, high modulus of elasticity, and high strength are required in a film for a house. Further, the recyclability of a material is also required in some cases from the viewpoint of efficient utilization of resources in recent years.

To meet the requirements as described above, cellulose is regarded as promising as a compounding material for the resin part which various members are provided with. Cellulose exists on the earth in a large amount and is a renewable natural resource, and therefore cellulose is suitable as a material having a high recyclability. In addition, it is known that cellulose is light in weight, the mechanical characteristics thereof are enhanced by micronizing the cellulose into a micro size, and when the micronization is allowed to progress to a nano size, cellulose becomes a material having extremely high modulus of elasticity and high strength. Further, a resin in which micronized cellulose is compounded has a more satisfactory surface smoothness as compared to a resin in which a glass fiber or a carbon fiber is compounded. Research on utilizing cellulose having such characteristics as a reinforcing material for a thermoplastic resin has been conducted, and the feasibility of the research is attracting attention.

As a method for producing a composite resin containing such a cellulose-based micro fiber and a thermoplastic resin, a method in which a plant fiber is first defibrillated (microfibrillated), and this microfibrillated plant fiber (cellulose-based micro fiber) is mixed and kneaded with a thermoplastic resin, such as polypropylene, using a compatibilizer or interface-reinforcing material for the purpose of controlling dispersibility and an interface of fiber-resin is known (For example, see United States Patent Application Publication No. US 2008/0146701). However, such a method includes at least a step of defibrillating (microfibrillating) plant fiber and a step of mixing this microfibrillated plant fiber (cellulose-based micro fiber) with a thermoplastic resin, thereby forming a composite. Therefore, the procedure is made complicated, production costs increase, and besides, reaggregation is liable to occur when the microfibrillated plant fiber is kneaded with the thermoplastic resin, and the actual situation is that controlling the reaggregation is difficult.

In recent years, a method in which plant fiber is chemically treated to modify the surface thereof, and this modified plant fiber is then kneaded with a thermoplastic resin with a processing machine has been proposed (For example, see International Publication No. WO 2013/133093). This method is a method of facilitating micronization of plant fiber while kneading the modified plant fiber together with a thermoplastic resin in a processing machine. However, also in such a method, plant fiber is swollen once, then subjected to action of a chemical substance, dried, and then put into the processing machine in step of a chemical treatment. Therefore, the method which is described in International Publication No. WO 2013/133093 is improved more than a conventional method is, but the procedure is complicated, so that there has been a limitation also in cost reduction.

Further, in the case of molding a molded article as described above, a lamp body for example, by injection molding using a composite resin as described in Patent Literature 1, the composite resin containing polypropylene and plant fiber, there is a problem that a metal mold for use in the molding is liable to corrode. Therefore, it is desirable that injection molding be performed while corrosion of a metal mold is prevented as much as possible.

SUMMARY

The present disclosure is related to providing a molded article provided with a resin part formed with a thermoplastic resin composition in which micronized cellulose is uniformly dispersed in a thermoplastic resin.

According to an aspect of the present disclosure, a molded article includes a resin part formed with a thermoplastic resin composition. The thermoplastic resin composition includes a thermoplastic resin, cellulose, and an ionic compound, wherein a content of the cellulose is 1 to 100 parts by mass based on 100 parts by mass of the thermoplastic resin, and a content of the ionic compound is 0.001 times or more and less than 1.000 times the content of the cellulose.

Further, it is preferable that the ionic compound is represented by the following formula (1) or (2):

Formula (1)

Formula (2)

wherein $Z^1$ represents =C(Ra)- or =N—, wherein Ra represents a hydrogen atom or a substituent; $L^1$ represents a divalent linking group; $R^1$ to $R^5$ each independently represent an alkyl group, an alkenyl group, a cycloalkyl group, an aryl group, or a heterocyclic group; at least two of $R^2$ to $R^5$ are optionally bonded to each other to form a ring; and $X^-$ represents an anion.

Further, it is preferable that the compound represented by the formula (1) or (2) is represented by any one of the following formulas (1a), (1b), and (2a) to 2(c):

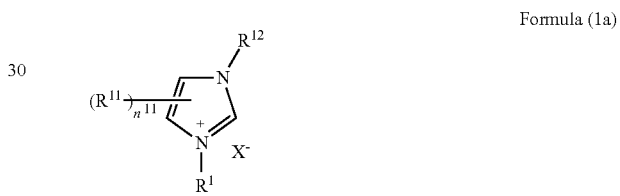

Formula (1a)

Formula (1b)

Formula (2a)

Formula (2b)

Formula (2c)

wherein $R^1$, $R^2$, and $X^-$ are as defined for $R^1$, $R^2$, and $X^-$ in the formula (1) or (2); $R^{11}$ and $R^{12}$ each independently represent a substituent; $n^{11}$ represents an integer of 0 to 3, and $n^{12}$ represents an integer of 0 to 5; when two or more $R^{11}$ exist, a plurality of $R^{11}$ are optionally the same with or different from each other, and at least two $R^{11}$ are optionally bonded to each other to form a ring;

$R^{13}$ to $R^{15}$ each independently represent an alkyl group, an alkenyl group, a cycloalkyl group, an aryl group, or a heterocyclic group, provided that at least two of $R^2$ and $R^{13}$ to $R^{15}$ are not bonded to each other to form a ring; $R^{21}$ is as defined for $R^2$;

and $Z^2$ represents a single bond, a methylene group, —C(=O)—, —O—, —S—, —S(=O)—, —SO$_2$—, —N(Rα1)-, or —N$^+$(Rα1)(Rα2)-, wherein Rα1 represents a hydrogen atom or a substituent, Rα2 represents a substituent, and Rα1 and Rα2 are optionally bonded to each other to form a ring.

Further, it is preferable that the $X^-$ represents a halogen ion, a carboxylate anion, a sulfonate anion, a phosphate anion, a phosphonate anion, a dicyanamide ion, or a bis (trifluoromethanesulfonyl)imide ion.

Further, it is preferable that the cellulose is a plant-derived, fibrous cellulose.

Further, it is preferable that 15% or more of the cellulose has a short side length of 2 μm or less.

Further, it is preferable that an area of a cellulose aggregate in the thermoplastic resin composition is less than 20000 μm$^2$.

Further, it is preferable that the molded article is a lamp body of a lighting appliance, a speaker unit, a connection box, a connector, a pulley, or a film for a house.

The present disclosure has enabled providing a molded article provided with a resin part in which micronized cellulose is uniformly dispersed and contained in a thermoplastic resin without aggregation and reaggregation.

DETAILED DESCRIPTION

Figure 1:
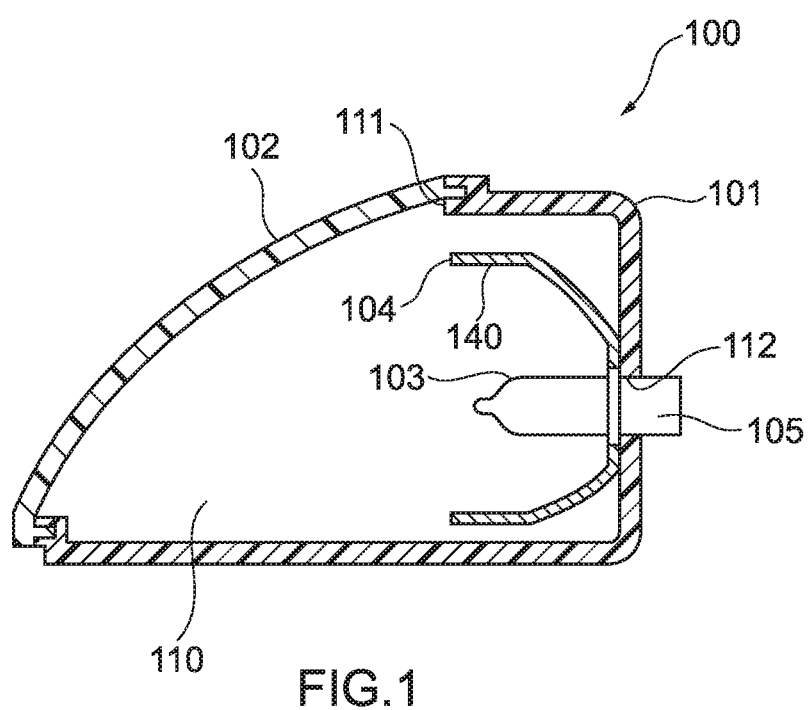
FIG. 1 is a schematic sectional diagram showing an example of a lamp body of a lighting appliance according to an embodiment of a molded article of the present disclosure.

A molded article of the present disclosure is provided with a resin part formed with a thermoplastic resin composition, the thermoplastic resin composition containing: a thermoplastic resin; cellulose; and an ionic compound, wherein a content of the cellulose is 1 to 100 parts by mass based on 100 parts by mass of the thermoplastic resin, and a content of the ionic compound is 0.001 times or more and less than 1.000 times the content of the cellulose. Thereby, the molded article provided with a resin part in which micronized cellulose is uniformly dispersed and contained in a thermoplastic resin without aggregation and reaggregation can be provided. In addition, by kneading plant-derived fibrous cellulose (pulp) containing an ionic compound with a thermoplastic resin, micronization of the pulp can be allowed to progress in the kneading step. Therefore, a step of micronizing the plant-derived fibrous cellulose in advance is made unnecessary, so that significant reduction in production costs can be expected. Further, modulus of elasticity increases due to the micronized cellulose, and therefore efficiency of strengthening of a molded article, such as, for example, a lamp body of a lighting appliance, a speaker unit, a connection box, a connector, a pulley, and a film for a house, can be enhanced.

In this way, the present disclosure enables more efficiently providing a molded article provided with a resin part using micronized cellulose. Moreover, by the present disclosure, molded articles, such as a pulley and a lamp body of a lighting appliance each being excellent in size accuracy, a speaker unit being excellent in acoustic characteristics, a connection box, a connector, and a film for a house each being excellent in recyclability, which are reduced in weight and highly strengthened, can be obtained.

<<Thermoplastic Resin Composition>>

The thermoplastic resin composition to be used for forming the resin part which the molded article of the present disclosure is provided with contains at least a thermoplastic resin, cellulose, and an ionic compound.

<Thermoplastic Resin>

The thermoplastic resin to be used in the present disclosure is not particularly limited, and may be any of the resins which are each generally used as a thermoplastic resin. This is due to the reason described below.

The present disclosure realizes micronization of cellulose by kneading the cellulose and the ionic compound in the thermoplastic resins, as will be described later. Therefore, the viscosity of the thermoplastic resins, when mixed with the cellulose, is an important characteristic. That is, the stress (Fh), which dispersion of the cellulose (including an ionic compound), the dispersion existing in the thermoplastic resins, feels in the shear field, is expressed simply by the following equation (1.1).

$$F_h = 6.12 \eta \dot{\gamma} R \quad (1.1)$$

It is to be noted that hereinafter, γ with · in the equation (1.1) will simply be described as γ. The stress (Fh) which the dispersion feels in the shear field represents the force which a spherical filler having a diameter of R feels in the thermoplastic resins having a shear rate of γ and having a viscosity of q. However, the cellulose existing in the thermoplastic resins is not spherical but is fibrous, therefore the equation as it is cannot be applied, but the equation for the spherical filler and the equation for the fibrous fiber are the same in principle, and it is considered that the parameters (η, γ, R) that affect the stress (Fh) which the dispersion feels in the shear field are also the same. Accordingly, to micronize the cellulose, how much force to be applied in the shear field inside the thermoplastic resins is important, and therefore it is considered that the larger η or γ is, the more advantageous.

Making the shear rate (γ) fast herein means mechanically making a shear rate to be applied to the thermoplastic resins fast. Accordingly, when the shear rate (γ) is made fast, the force which the cellulose feels inside the thermoplastic resins is made large, but the friction force due to kneading is made large at the same time, so that the temperature of the thermoplastic resins increases. However, cellulose generally has a characteristic that it undergoes a color change when the temperature exceeds 200° C. and thermally decomposes from around 300° C., and therefore a method in which cellulose is exposed to a shear field where the temperature is extremely raised is not suitable from the viewpoint of keeping the characteristics as a material.

As can be seen from this, to micronize the cellulose, increasing the viscosity (η) of the thermoplastic resins is important. Generally, the viscosity (η) of a thermoplastic resin satisfies the relationship (Andrade's equation) as follows.

$$\eta = Ae^{Ev/RT} \quad (1.2)$$

Herein, A represents a constant of proportionality, Ev represents flow activation energy, R represents a gas constant, and T represents temperature (K). The flow activation energy corresponds to the Arrhenius' activation energy in a chemical reaction and is understood by regarding the flow as a rate process. Accordingly, the important parameter for controlling the viscosity (η) is temperature. The temperature can be handled and adjusted as a processing temperature irrespective of the types of the thermoplastic resins. Accordingly, a wide range of thermoplastic resins each as a medium for giving force that is needed to micronize the cellulose are applicable without any particular restrictions on the types thereof.

Examples of the thermoplastic resin include a polyolefin resin, a polyester resin, a polycarbonate resin, a polyamide resin, a polyimide resin, a polyurethane resin, a polyphenylene sulfide resin, a polyphenylene oxide resin, a cellulose acylate resin, and a phenoxy resin. Among these, a polyolefin resin is preferable in the present disclosure.

<Polyolefin Resin>

The polyolefin resin is a polyolefin resin obtained by polymerizing at least one olefin and may be a homopolymer or a copolymer. Examples of such an olefin include α-olefins having 4 to 12 carbon atoms, including ethylene, propylene, isobutylene, and isobutene (1-butene), butadiene, isoprene, a (meth)acrylate, (meth)acrylic acid, (meth)acrylamide, vinyl alcohol, vinyl acetate, vinyl chloride, styrene, and acrylonitrile.

Examples of the α-olefins having 4 to 12 carbon atoms include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methyl ethyl-1-butene, 1-octene, methyl-1-pentene, ethyl-1-hexene, dimethyl-1-hexene, propyl-1-heptene, methyl ethyl-1-heptene, trimethyl-1-pentene, propyl-1-pentene, diethyl-1-butene, 1-nonene, 1-decene, 1-undecene and 1-dodecene.

Examples of the polyolefin resin include vinyl resins such as a polyethylene resin, a polypropylene resin, a polyisobutylene resin, a polyisobutene resin, a polyisoprene resin, a polybutadiene resin, a (meth)acrylic resin (so-called acrylic resin), and a polyvinyl chloride resin, a poly(meth)acrylamide resin, a polystyrene resin, an acrylonitrile/butadiene/styrene copolymer resin (ABS resin), an ethylene/(meth)acrylate copolymer, and an ethylene/vinyl acetate copolymer.

Among these resins, a polyethylene resin, a polypropylene resin, an acrylonitrile/butadiene/styrene copolymer resin (ABS resin) are preferable, more preferably a polyethylene resin and a polypropylene resin.

Examples of the polyethylene resin include an ethylene homopolymer and an ethylene-α-olefin copolymer. As the α-olefin, 1-butene, 1-pentene, 1-hexene, and 1-octene are preferable.

Examples of the ethylene-α-olefin copolymer include an ethylene-1-butene copolymer, an ethylene-1-pentene copolymer, an ethylene-1-hexene copolymer, and an ethylene-1-octene copolymer.

When the polyethylene resin is classified according to the density or the shape, polyethylene may be any of high density polyethylene (HDPE), low density polyethylene (LDPE), very low density polyethylene (VLDPE), linear low density polyethylene (LLDPE), and ultra high molecular weight-polyethylene (UHMW-PE).

Examples of the polypropylene resin include a propylene homopolymer, a propylene-ethylene random copolymer, a propylene-α-olefin random copolymer, a propylene-ethylene-α-olefin copolymer, and a propylene block copolymer (copolymer obtained by copolymerizing: a propylene homopolymer component or a copolymer component mainly having a constitutional unit of propylene; at least one of monomers selected from ethylene and α-olefins; and propylene). These polypropylene resins may be used singly, or two or more thereof may be used together.

As the α-olefin to be used for the polypropylene resin, 1-butene, 1-pentene, 1-hexene, 4-methyl-1-pentene, 1-octene, 1-decene are preferable, more preferably 1-butene, 1-hexene, and 1-octene.

Examples of the propylene-α-olefin random copolymer include a propylene-1-butene random copolymer, a propylene-1-hexene random copolymer, and a propylene-1-octene random copolymer.

Examples of the propylene-ethylene-α-olefin copolymer include a propylene-ethylene-1-butene copolymer, a propylene-ethylene-1-hexene copolymer, and a propylene-ethylene-1-octene copolymer.

Examples of the propylene block copolymer include a (propylene)-(propylene-ethylene) copolymer, (propylene)-(propylene-ethylene-1-butene) copolymer, (propylene)-(propylene-ethylene-1-hexene) copolymer, (propylene)-(propylene-1-butene) copolymer, (propylene)-(propylene-1-hexene) copolymer, (propylene-ethylene)-(propylene-ethylene) copolymer, (propylene-ethylene)-(propylene-ethylene-1-butene) copolymer, (propylene-ethylene)-(propylene-ethylene-1-hexene) copolymer, (propylene-ethylene)-(propylene-1-butene) copolymer, (propylene-ethylene)-(propylene-1-hexene) copolymer, (propylene-1-butene)-(propylene-ethylene) copolymer, (propylene-1-butene)-(propylene-ethylene-1-butene) copolymer, (propylene-1-butene)-(propylene-ethylene-1-hexene) copolymer, a (propylene-1-butene)-(propylene-1-butene) copolymer, and a (propylene-1-butene)-(propylene-1-hexene) copolymer.

Among these polypropylene resins, a propylene homopolymer, a propylene-ethylene random copolymer, a propylene-1-butene random copolymer, a propylene-ethylene-1-butene copolymer and a propylene block copolymer are preferable.

The crystallinity of a polypropylene resin can be determined from the melting temperature (melting point) or stereoregularity, and is adjusted according to the product quality required in the polyolefin resin composition or the product quality required in a molded article obtained by molding the polyolefin resin composition. It is to be noted that the stereoregularity is called an isotactic index or a syndiotactic index.

The isotactic index is determined by the $^{13}$C-NMR method described in Macromolecules, vol. 8, p. 687 (1975). Specifically, the isotactic index of a polypropylene resin is determined as an area fraction of an mmmm peak in all the absorption peaks in the carbon region of a methyl group in a $^{13}$C-NMR spectrum. A polypropylene resin having a high isotactic index has a high crystallinity, and it is preferable that the isotactic index be 0.96 or more, more preferably 0.97 or more, and still more preferably 0.98 or more.

The syndiotactic index is determined by the method described in J. Am. Chem. Soc., 110, 6255(1988) or Angew. Chem. Int. Ed. Engl., 1955, 34, 1143-1170, and a polypropylene resin having a high syndiotactic index has a high crystallinity.

The polyolefin resin may be a modified polyolefin resin, and in addition, may contain a modified polyolefin resin in addition to an unmodified polyolefin resin. Examples of the modified polyolefin resin include a polyolefin resin graft-modified with an unsaturated carboxylic acid or a derivative thereof. Examples of the unsaturated carboxylic acid include maleic acid, fumaric acid, itaconic acid, acrylic acid, and methacrylic acid, and examples of the unsaturated carboxylic acid derivative include maleic anhydride, itaconic anhydride, methyl acrylate, ethyl acrylate, butyl acrylate, glycidyl acrylate, methyl methacrylate, ethyl methacrylate, butyl methacrylate, glycidyl methacrylate, maleic acid monoethyl ester, maleic acid diethyl ester, fumaric acid monomethyl ester, and fumaric acid diethyl ester. Among these unsaturated carboxylic acids and/or derivatives thereof, the unsaturated carboxylic acid or the derivative thereof is preferably acrylic acid, glycidyl ester of methacrylic acid, or maleic anhydride.

Examples of the acrylic resin include: a homopolymer or copolymer of acrylic monomer or monomers, such as (meth)acrylic acid, (meth)acrylic acid esters, and acrylonitrile; and a copolymer of an acrylic monomer and another monomer or other monomers. Among these, examples of the (meth)acrylic acid esters include: (meth)acrylic acid alkyl esters each having a C1 to 10 alkyl group, such as methyl (meth)acrylate, ethyl (meth)acrylate, propyl (meth)acrylate, butyl (meth)acrylate, and 2-ethylhexyl (meth)acrylate; hydroxyalkyl (meth)acrylates such as hydroxyethyl (meth)acrylate; and (meth)acrylic acid glycidyl ester.

Specific examples of the homopolymer or copolymer of acrylic monomer or monomers include a poly(meth)acrylic acid ester, an acrylic ester-methacrylic acid ester copolymer, and polyacrylonitrile. Specific examples of the copolymer of an acrylic monomer and another monomer or other monomers include a (meth)acrylic acid ester-styrene copolymer, a (meth)acrylic acid-styrene copolymer, an acrylonitrile-butadiene-styrene copolymer, an acrylonitrile-styrene copolymer, and an acrylonitrile-styrene-(meth)acrylic acid ester copolymer.

Examples of the vinyl resin include vinyl chloride resins [such as homopolymers of a vinyl chloride monomer (such as a polyvinyl chloride resin) and copolymers of a vinyl chloride monomer and another monomer (such as a vinyl chloride-vinyl acetate copolymer and a vinyl chloride-(meth)acrylate copolymer)], vinyl alcohol resins (including homopolymers such as polyvinyl alcohol, copolymers such as an ethylene-vinyl alcohol copolymer, and the like), and polyvinyl acetal resins such as polyvinyl formal. These vinyl resins can be used singly or by combining two or more thereof.

The melt flow rate (MFR) of the polyolefin resin is usually 0.01 to 400 g/10 min and is preferably 0.1 to 400 g/10 min, more preferably 0.5 to 200 g/10 min from the viewpoint of enhancing mechanical strength and production stability. It is to be noted that the MFR refers to the mass (g/10 min) of a polymer that flows out per 10 minutes at 190° C. under a load of 2.16 kg in accordance with JIS K 7210, unless otherwise noted.

<Cellulose>

It is preferable that the cellulose to be used in the present disclosure be plant-derived fibrous cellulose, especially plant-derived, micro-fibrous cellulose. In the molded article of the present disclosure, such as, for example, a lamp body of a lighting appliance, a speaker unit, a connection box, a connector, a pulley, and a film for a house, the cellulose is used as a compounding material for a resin part, and therefore, weight reduction and high strengthening can be achieved. In addition, recyclability of the molded article can also be improved. Further, for example, when the embodiment of the molded article is like a film, a film for a house, as a molded article, can possess an improved surface smoothness by including a layer of the thermoplastic resins in which such fibrous cellulose is composited, and a film for a house possessing an excellent light permeability can thereby be obtained. In addition, cellulose is a polar molecule having an —OH group, and the affinity between molecules is therefore high. Thus, a film for a house excellent in adhesion performance can be obtained because the interfacial adhesive force of the film for a house is improved. Thereby, an advantageous point, such as, for example, that the film for a house, when broken, can simply be repaired with an adhesive tape or the like, is obtained.

Pulp is a raw material for paper and contains as the main component a tracheid which is extracted from a plant. From the chemical viewpoint, the main component of pulp is a polysaccharide, and the main component of the polysaccharide is cellulose. The plant-derived fibrous cellulose is not particularly limited, and examples thereof include plant-derived cellulose such as wood, bamboo, hemp, jute, kenaf, harvest losses of farm products (for example, straw of wheat, rice, or the like, maize, stems of raw cotton or the like, sugarcane), cloth, regenerated pulp, old paper, and wood flour; however, in the present disclosure, wood or wood-derived fibrous cellulose is preferable, and the plant-derived fibrous cellulose is more preferably wood flour, particularly preferably craft pulp. It is to be noted that the craft pulp is a general term of pulp obtained by removing lignin/hemicellulose from wood or a plant raw material by a chemical treatment with caustic soda or the like to take out cellulose that is almost pure.

The present disclosure realizes micronization of cellulose by compounding the ionic compound in such cellulose and kneading a resultant mixture in the thermoplastic resin.

In the plant-derived fibrous cellulose, 30 to 40 molecules make a bundle and form a microfibril having an ultrathin width of a diameter of about 3 nm and a length of several hundred nm to several tens μm and having a high crystallinity, and such microfibrils form a structure in which these are made into a bundle through soft amorphous portions. Powdered cellulose to be used as a raw material in the present disclosure is an aggregate of these bundles. It is to be noted that the molecular chain of cellulose forming a microfibril is an extended chain crystal, and the microfibril thereby has an extremely high modulus of elasticity, and it is said that the microfibril ideally has a modulus of elasticity of about 140 GPa. In addition, it is known that the modulus of elasticity of cellulose increases as the wire diameter gets smaller. Accordingly, to improve the performance as a reinforced resin, it is more effective when the diameter of the cellulose dispersed in the thermoplastic resins is made thinner and is micronized more.

In the present disclosure, it is preferable that the micronized cellulose be cellulose of rod-like fiber. The embodiment of the rod-like fiber is not particularly limited, and examples thereof include a straight fiber and a bent fiber. It is preferable that the length of the short side (diameter) be 2 µm or less, more preferably 3 nm to 2 µm, still more preferably 3 nm to 1 µm, further still more preferably 3 nm to 0.5 µm, and particularly preferably 4 to 300 nm. On the other hand, it is preferable that the length of the long side (length) be 0.03 to 500 µm, more preferably 0.05 to 200 µm. It is preferable that the aspect ratio be 5 or more, more preferably 10 to 1000. It is to be noted that the aspect ratio refers to a value obtained by dividing the average length by the average fiber diameter.

Further, in the present disclosure, it is preferable that the micronized cellulose be such that 15% or more of the cellulose contained has a short side length of 2 µm or less. The content of the cellulose fiber having a short side length of 2 µm or less is more preferably 20% or more, still more preferably 25% or more.

Further, it is preferable in the present disclosure that the micronized cellulose be uniformly dispersed in the thermoplastic resin composition without aggregation and reaggregation. Therefore, it is preferable that even when cellulose aggregates exist, the areas of the existing cellulose aggregates be less than 20000 µm². That is, even when cellulose aggregates exist, it is preferable that the area of the largest aggregate among the existing aggregates be less than 20000 µm². It is to be noted that the short side length and the area of a cellulose aggregate can be measured with an electron microscope or a microscope for industrial use. Specifically, the short side length and the area of a cellulose aggregate can be measured as described in Examples.

In the present disclosure, the content of the cellulose is 1 to 100 parts by mass, preferably 5 to 70 parts by mass, and more preferably 10 to 50 parts by mass based on 100 parts by mass of the thermoplastic resins. When the content of the cellulose is less than 1 part by mass, transmission of force to the cellulose does not occur effectively during kneading, making it substantially difficult to obtain micronized cellulose. Conversely, when the content of the cellulose exceeds 100 parts by mass, satisfactorily dispersing the cellulose in the thermoplastic resins is made difficult, so that satisfactory characteristics to use the cellulose as a material cannot be obtained.

<Ionic Compound>

The thermoplastic resin composition to be used in the present disclosure contains an ionic compound together with cellulose. The thermoplastic resin composition of the present disclosure may contain an ionic compound together with the cellulose. It is preferable that the ionic compound to be used in the present disclosure be an ionic compound generally called an ionic liquid. The ionic liquid is a salt existing as a liquid in a wide temperature range and is a liquid composed of ions only. Generally, a salt having a melting point of 100° C. or less is defined as an ionic liquid (IL), and an ionic liquid having a melting point at around room temperature is called "RTIL (room temperature IL)".

It is preferable that the ionic liquid to be used in the present disclosure be an ionic compound generally called an ionic liquid, but the melting point may exceed 100° C., for example, 150° C. or more. That is, in the present disclosure, the cellulose is micronized by kneading the cellulose in a processing machine at a stage where a cellulose-reinforced resin or a cellulose-reinforced resin composition is processed and molded by extrusion, injection, or the like, and therefore the temperature in a processing step and in a processing machine can be set to the melting point of the ionic compound or higher. Accordingly, for example, even if the melting point of the ionic compound is 180° C., processing is performed at a temperature higher than 180° C., for example, at 190° C., and thereby the same action as the action of a so-called ionic liquid can be expected.

In the present disclosure, it is preferable that the ionic compound be an organic, ionic compound, an onium salt, such as a quaternary phosphonium salt or a quaternary ammonium salt, and among these, it is preferable that the ionic compound be a compound represented by the following formula (1) or (2).

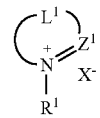

Formula (1)

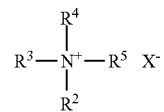

Formula (2)

In the formulas (1) and (2), $Z^1$ represents =C(Ra)- or =N—, wherein Ra represents a hydrogen atom or a substituent. $L^1$ represents a divalent linking group. $R^1$ to $R^5$ each independently represent an alkyl group, an alkenyl group, a cycloalkyl group, an aryl group, or a heterocyclic group. At least two of $R^2$ to $R^5$ are optionally bonded to each other to form a ring. $X^-$ represents an anion.

$Z^1$ represents =C(Ra)- or =N—, and =C(Ra)- is preferable.

Examples of the substituent in Ra include an alkyl group, an alkenyl group, a cycloalkyl group, an aryl group, a heterocyclic group, an alkoxy group, an aryloxy group, an alkylthio group, an arylthio group, an amino group, an acyl group, an acylamino group, a sulfonamide group, a carbamoyl group, a sulfamoyl group, an alkoxycarbonyl group, an aryloxycarbonyl group, an acyloxy group, a sulfonyl group, a halogen atom, a hydroxy group, a carboxy group, and a sulfo group.

It is preferable that the carbon numbers of the alkyl group be 1 to 20, more preferably 1 to 12, and still more preferably 1 to 8. Examples of the alkyl group include methyl, ethyl n-propyl, isopropyl, n-butyl, isobutyl, t-butyl, n-pentyl, t-pentyl, n-hexyl, n-pentyl, n-octyl, 2-ethylhexyl, n-octyl, n-decyl, n-dodecyl, n-hexadecyl, and n-octadecyl. The alkyl group optionally has a substituent, and examples of the substituent include the substituents given as examples in Ra.

It is preferable that the carbon numbers of the alkenyl group be 2 to 20, more preferably 2 to 12, and still more preferably 2 to 8. Examples of the alkenyl group include vinyl, allyl, and oleyl. The alkenyl group optionally has a substituent, and examples of the substituent include the substituents given as examples in Ra.

It is preferable that the cycloalkyl group be a cycloalkyl group of a 3- to 7-membered ring, more preferably a cycloalkyl group of a 3-, 5-, 6-, or 7-membered ring, and still more preferably a cycloalkyl group of a 5- or 6-membered ring. It is preferable that the carbon numbers of the cycloalkyl group be 3 to 20, more preferably 3 to 12, still more preferably 5 to 12, and particularly preferably 5 to 8. Examples of the cycloalkyl group include cyclopropyl, cyclopentyl, and cyclohexyl. The cycloalkyl group optionally has a substituent, and examples of the substituent include the substituents given as examples in Ra.

It is preferable that the carbon numbers of the aryl group be 6 to 20, more preferably 6 to 12, and still more preferably 6 to 8. Examples of the aryl group include phenyl and naphthyl. The aryl group optionally has a substituent, and examples of the substituent include the substituents given as examples in Ra.

With respect to the hetero ring of the heterocyclic group, the hetero atom forming the hetero ring is selected from an oxygen atom, a sulfur atom, and a nitrogen atom, and a hetero ring of a 5- or 7-membered ring is preferable. In addition, the hetero ring may be an aromatic ring, an unsaturated ring, or a saturated ring. It is preferable that the carbon numbers of the heterocyclic group be 0 to 20, more preferably 1 to 12, and still more preferably 1 to 8. Examples of the hetero ring of the heterocyclic group include a furan ring, a thiophene ring, a pyrrole ring, an imidazole ring, a pyrazole ring, a triazole ring, a tetrazole ring, an oxazole ring, a thiazole ring, a pyridine ring, a pyrazine ring, a pyrimidine ring, a pyridazine ring, a triazine ring, an indoline ring, a tetrahydrofuran ring, a tetrahydrothiophene ring, a pyrrolidine ring, an imidazolidine ring, an imidazoline ring, a pyrazodine ring, a piperidine ring, a piperazine ring, a morpholine ring, a thiomorpholine ring, a 1,1-dioxothiomorpholine ring, a 1-oxomorpholine ring, a quinuclidine ring, a 1,4-diazabicyclo[2,2,2]octane ring, and a cyanuric acid ring. In addition, examples of the hetero ring of the heterocyclic group also include hetero rings whose rings are condensed with a benzene ring or another ring, such as a benzofuran ring, a benzothiophene ring, a benzimidazole ring, a benzopyrazole ring, a benzotriazole ring, a benzoxazole ring, and a benzothiazole ring. The heterocyclic group optionally has a substituent, and examples of the substituent include the substituents given as examples in Ra.

It is preferable that the carbon numbers of the alkoxy group be 1 to 20, more preferably 1 to 12, and still more preferably 1 to 8. Examples of the alkoxy group include methoxy, ethoxy, n-propoxy, isopropoxy, n-butoxy, isobutoxy, t-butoxy, n-pentyloxy, t-pentyloxy, n-hexyloxy, n-pentyloxy, n-octyloxy, 2-ethylhexyloxy, n-octyloxy, n-decyloxy, n-dodecyloxy, n-hexadecyloxy, and n-octadecyloxy. The alkoxy group optionally has a substituent, and examples of the substituent include the substituents given as examples in Ra.

It is preferable that the carbon numbers of the aryloxy group be 6 to 20, more preferably 6 to 12, and still more preferably 6 to 8. Examples of the aryloxy group include phenoxy and naphthoxy. The aryloxy group optionally has a substituent, and examples of the substituent include the substituents given as examples in Ra.

It is preferable that the carbon numbers of the alkylthio group be 1 to 20, more preferably 1 to 12, and still more preferably 1 to 8. Examples of the alkylthio group include methylthio, ethylthio, n-propylthio, isopropylthio, n-butylthio, isobutylthio, t-butylthio, n-pentylthio, t-pentylthio, n-hexylthio, n-pentylthio, n-octylthio, 2-ethylhexylthio, n-octylthio, n-decylthio, n-dodecylthio, n-hexadecylthio, and n-octadecylthio. The alkylthio group optionally has a substituent, and examples of the substituent include the substituents given as examples in Ra.

It is preferable that the carbon numbers of the arylthio group be 6 to 20, more preferably 6 to 12, and still more preferably 6 to 8. Examples of the arylthio group include phenylthio and naphthylthio. The arylthio group optionally has a substituent, and examples of the substituent include the substituents given as examples in Ra.

The amino group includes an amino group, an alkylamino group, an arylamino group, and a heterocyclic amino group, and it is preferable that the carbon numbers of the amino group be 0 to 20, more preferably 0 to 12, still more preferably 1 to 12, and particularly preferably 1 to 8. Examples of the amino group include amino, methylamino, dimethylamino, ethylamino, diethylamino, isopropylamino, di-n-propylamino, 2-ethylhexylamino, n-octylamino, dodecylamino, phenylamino, diphenylamino, and phenylmethylamino. The amino group optionally has a substituent, and examples of the substituent include the substituents given as examples in Ra.

The acyl group includes a formyl group, an alkanoyl group, an acycloalkanoyl group, an alkenoyl group, an aryloyl group, and a heterocyclic carbonyl group. It is preferable that the carbon numbers of the acyl group be 1 to 20, more preferably 2 to 12, and still more preferably 2 to 8. Examples of the acyl group include formyl, acetyl, propionyl, butyryl, valeryl, pivaloyl, lauroyl, palmitoyl, stearoyl, cyclopropylcarbonyl, cyclopentylcarbonyl, cyclohexylcarbonyl, acryloyl, methacryloyl, oleyl, benzoyl, naphthoyl, nicotinoyl, and isonicotinoyl. The acyl group optionally has a substituent, and examples of the substituent include the substituents given as examples in Ra.

Examples of the acylamino group include an amino group in which the nitrogen atom is substituted with the acyl group. It is preferable that the carbon numbers of the acylamino group be 1 to 20, more preferably 2 to 12, and still more preferably 2 to 8. Examples of the acylamino group include formylamino, acetylamino, propionylamino, butyrylamino, valerylamino, pivaloylamino, lauroylamino, palmitoylamino, stearoylamino, cyclopropylcarbonylamino, cyclopentylcarbonylamino, cyclohexylcarbonylamino, acryloylamino, methacryloylamino, oleylamino, bezoylamino, naphthoylamino, nicotinoylamino, and isonicotinoylamino. The acylamino group optionally has a substituent, and examples of the substituent include the substituents given as examples in Ra.

The sulfonamide group includes an alkylsulfonamide group, a cycloalkylsufonamide group, an arylsulfonamide group, and a heterocyclic sulfonamide group. It is preferable that the carbon numbers of the sulfonamide group be 1 to 20, more preferably 2 to 12, and still more preferably 2 to 8. Examples of the sulfonamide group include methanesulfonamide, ethanesulfonamide, propanesulfonamide, octanesulfonamide, cyclopentanesulfonamide, cyclohexanesulfonamide, benzenesulfonamide, and naphthalenesulfonamide. The sulfonamide group optionally has a substituent, and examples of the substituent include the substituents given as examples in Ra.

The carbamoyl group includes a carbamoyl group, an alkylcarbamoyl group, a cycloalkylcarbamoyl group, an arylcarbamoyl group, and a heterocyclic carbamoyl group. It is preferable that the carbon numbers of the carbamoyl group be 1 to 20, more preferably 2 to 12, and still more preferably 2 to 8. Examples of the carbamoyl group include N-methylcarbamoyl, N,N-dimethylcarbamoyl, N-phenylcarbamoyl, N-phenyl-N-methylcarbamoyl, N-cyclohexylcarbamoyl, N-imidazolylcarbamoyl, pyrrolidinecarbonyl, and piperidinecarbonyl. The carbamoyl group optionally has a substituent, and examples of the substituent include the substituents given as examples in Ra.

The sulfamoyl group includes a sulfamoyl group, an alkylsulfamoyl group, a cycloalkylsulfamoyl group, an arylsulfamoyl group, and a heterocyclic sulfamoyl group. It is preferable that the carbon numbers of the sulfamoyl group be 0 to 20, more preferably 1 to 12, and still more preferably 1 to 8. Examples of the sulfamoyl group include N-methylsulfamoyl, N,N-dimethylsulfamoyl, N-phenylsulfamoyl, N-phenyl-N-methylsulfamoyl, N-cyclohexylsulfamoyl, N-imidazolylsulfamoyl, pyrrolidinesulfamoyl, and piperidinesulfamoyl. The sulfamoyl group optionally has a substituent, and examples of the substituent include the substituents given as examples in Ra.

It is preferable that the carbon numbers of the alkoxycarbonyl group be 2 to 20, more preferably 2 to 12, and still more preferably 2 to 8. Examples of the alkoxycarbonyl group include methoxycarbonyl, ethoxycarbonyl, n-propoxycarbonyl, isopropoxycarbonyl, n-butoxycarbonyl, isobutoxycarbonyl, t-butoxycarbonyl, n-pentyloxycarbonyl, t-pentyloxycarbonyl, n-hexyloxycarbonyl, n-pentyloxycarbonyl, n-octyloxycarbonyl, 2-ethylhexyloxycarbonyl, n-octyloxycarbonyl, n-decyloxycarbonyl, n-dodecyloxycarbonyl, n-hexadecyloxycarbonyl, and n-octadecyloxycarbonyl. The alkoxycarbonyl group optionally has a substituent, and examples of the substituent include the substituents given as examples in Ra.

It is preferable that the carbon numbers of the aryloxycarbonyl group be 7 to 20, more preferably 7 to 12. Examples of the aryloxycarbonyl group include phenoxycarbonyl and napthoxycarbonyl. The aryloxycarbonyl group optionally has a substituent, and examples of the substituent include the substituents given as examples in Ra.

The acyloxy group includes a formyloxy group, an alkanoyloxy group, an acycloalkanoyloxy group, an alkenoyloxyl group, an arloyloxy group, and a heterocyclic carbonyloxy group. It is preferable that the carbon numbers of the acyloxy group be 1 to 20, more preferably 2 to 12, and still more preferably 2 to 8. Examples of the acyloxy group include formyloxy, acetyloxy, propionyloxy, butyryloxy, valeryloxy, pivaloyloxy, lauroyloxy, palmitoyloxy, stearoyloxy, cyclopropylcarbonyloxy, cyclopentylcarbonyloxy, cyclohexylcarbonyloxy, acryloyloxy, methacryloyloxy, oleyloxy, benzoyloxy, naphthoyloxy, nicotinoyloxy, and isonicotinoyloxy. The acyloxy group optionally has a substituent, and examples of the substituent include the substituents given as examples in Ra.

The sulfonyl group includes an alkylsulfonyl group, a cycloalkylsulfonyl group, an arylsulfonyl group, and a heterocyclic sulfonyl group. It is preferable that the carbon numbers of the sulfonyl group be 1 to 20, more preferably 2 to 12, and still more preferably 2 to 8. Examples of the sulfonyl group include methanesulfonyl, ethanesulfonyl, propanesulfonyl, octanesulfonyl, cyclopentanesulfonyl, cyclohexanesulfonyl, benzenesulfonyl, and naphthalenesulfonyl. The sulfonyl group optionally has a substituent, and examples of the substituent include the substituents given as examples in Ra.

Examples of the halogen atom include a fluorine atom, a chlorine atom, a bromine atom, and an iodine atom.

It is preferable that Ra be a hydrogen atom, an alkyl group, a cycloalkyl group, an aryl group, a heterocyclic group, an alkoxy group, an alkylthio group, or an amino group, more preferably a hydrogen atom, an alkyl group, a cycloalkyl group, or an aryl group, still more preferably a hydrogen atom or an alkyl group, and particularly preferably a hydrogen atom.

$L^1$ represents a divalent linking group, it is preferable that $L^1$ be a linking group that forms a 5- or 6-membered, nitrogen-containing hetero ring together with $-N^+(R^1)=Z^1-$, and $L^1$ is more preferably a linking group that forms a 5- or 6-membered, nitrogen-containing heteroaromatic ring, particularly preferably a 5-membered, nitrogen-containing heteroaromatic ring together with $-N^+(R^1)=Z^1-$. Herein, the above-described nitrogen-containing hetero ring formed is optionally condensed with a benzene ring or another ring or optionally substituted with a substituent. Examples of the substituent include the substituents in Ra.

It is preferable that the divalent linking group in L be a linking group such that the linking atom is selected from a carbon atom, an oxygen atom, a sulfur atom, and a nitrogen atom. Examples of the ring formed with the divalent linking group in $L^1$ and $-N^+(R^1)=Z^1-$ include an imidazole ring, a pyrazole ring, a triazole ring, a tetrazole ring, an oxazole ring, a thiazole ring, a pyridine ring, a pyrazine ring, a pyrimidine ring, a pyridazine ring, a triazine ring, a 1-pyrrolidine ring, an imidazoline ring, and condensates thereof with benzene.

The alkyl group, alkenyl group, cycloalkyl group, aryl group, and heterocyclic group in $R^1$ to $R^5$ are as defined for the alkyl group, alkenyl group, cycloalkyl group, aryl group, and heterocyclic group in Ra, and preferred ranges thereof are also the same.

It is preferable that the ring formed in such a way that at least two of $R^2$ to $R^5$ are bonded to each other be a 5- to 7-membered ring, preferably a 5- or 6-membered ring. In addition, the ring to be formed may be an aromatic ring, an unsaturated ring, or a saturated ring, but it is preferable that the ring to be formed be a saturated ring.

Examples of the ring formed in such a way that at least two of $R^2$ to $R^5$ are bonded to each other include a pyrrolidine ring, a pyrroline ring, a pyrazolidine ring, a pyrazoline ring, a pyrrole ring, a piperidine ring, a piperazine ring, a morpholine ring, a thiomorpholine ring, a 1,1-dioxothiomorpholine ring, and a 1-oxomorpholine ring.

Examples of the ring formed in such a way that three of $R^2$ to $R^5$ are bonded to each other include a quinuclidine ring and a 1,4-diazabicyclo[2,2,2]octane ring.

Specific examples of the cation (the part other than $X^-$) of the compound represented by formula (1) or (2) include the following cations.

1-Alkyl-3-methylimidazoliums such as 1-ethyl-3-methylimidazolium, 1-butyl-3-methylimidazolium, 1-hexyl-3-methylimidazolium, and 1-octyl-3-methylimidazolium, 1,3-dimethylimidazolium, 1,3-diethylimidazolium, 1,2,3-trimethylimidazolium, 1,2,3,4-tetramethylimidazolium, 1,3,4-trimethyl-2-ethylimidazolium, 1,3-dimethyl-2,4-diethylimidazolium, 1,2-dimethyl-3,4-diethylimidazolium, 1-methyl-2,3,4-triethylimidazolium, 1,2,3,4-tetraethylimidazolium, 1,3-dimethyl-2-ethylimidazolium, 1-ethyl-2,3-dimethylimidazolium, 1,2,3-triethylimidazoliuml-ethyl-2,3-dimethylimidazolium, 1-propyl-2,3-dimethylimidazolium, 1-butyl-2,3-dimethylimidazolium, 1-pentyl-2,3-dimethylimidazolium, 1-hexyl-2,3-dimethylimidazolium, 1-heptyl-2,3-dimethylimidazolium, 1-octyl-2,3-dimethylimidazolium1-cyanomethyl-3-methylimidazolium, 1-(2-hydroxyethyl)-3-methylimidazolium, 1-allyl-3-methylimidazolium, 1-butylpyridinium, 1-hexylpyridinium, N-(3-hydroxypropyl)pyridinium, N-hexyl-4-dihylaminopyridinium, N-(methoxyethyl)-N-methylmorpholium, 1-(2-methoxyethyl)-1-methylpyrrolidiniumn, 1-(methoxyethyl)-1-methylpiperidinium, N-(methoxyethyl)-1-methylpyrrolidinium, 1,2-dimethylpyrazolium, N-(methoxyethyl)-2-methyloxazolium, N-(methoxyethyl)-2-methylthiazolium, 1,2,3-trimethylimidazolinium, 1,2,3,4-tetramethylimidazolinium, 1,3,4-trimethyl-2-ethylimiidazolinium, 1,3-dimethyl-2,4-diethylimidazolinium, 1,2-dimethyl-3,4-diethylimidazolinium, 1-methyl-2,3,4-triethylimidazolinium, 1,2,3,4-tetraethylimidazolinium, 1,3- dimethyl-2-ethylimidazolinium, 1-ethyl-2,3-dimethylimidazolinium, 1,2,3-triethylimidazolinium, 1,1-dimethyl-2-heptylimidazolinium, 1,1-dimethyl-2-(2-heptyl)imidazolinium, 1,1-dimethyl-2-(3-heptyl)imidazolinium, 1,1-dimethyl-2-(4-heptyl)imidazolinium, 1,1-dimethyl-2-dodecylimidazolinium, 1,1-dimethylimidazolinium, 1,1,2-trimethylimidazolinium, 1,1,2,4-tetramethylimidazolinium, 1,1,2,5-tetramethylimidazolinium, 1,1,2,4,5-pentamethylimidazolinium, tetramethylammonium, ethyltrimethylammonium, diethyldimethylammonium, triethylmethylammonium, tetraethylammonium, trimethylpropylammonium, diethylmethyl(2-methoxyethyl)ammonium, N,N-diethyl-N-methyl-N-(2-methoxyethyl)ammonium, N-ethyl-N,N-dimethyl-2-methoxyethylammonium, trimethylbenzylammonium, N,N-bis(2-methoxyethyl)pyrrolidinium, N,N-bis(2-hydroxyethyl)pyrrolidinium, N-methyl-N-2-methoxyethylpyrrolidinium, N,N-bis(2-ethylhexyl)morpholinium, N,N-bis(2-ethylhexyl)thiomorpholinium, N,N-bis(2-hydroxyethyl)piperidinium, N,N,N',N'-tetra(2-hydroxyethyl)piperazinium, N,N-bis(2-ethoxyethyl-1,1-dioxothiomorpholinium, N,N-bis(2-ethoxyethyl-1-oxothiomorpholinium, 1,3-dimethyl-1,4,5,6-tetrahydropyrimidinium, 1,2,3-trimethyl-1,4,5,6-tetrahydropyrimidinium, 1,2,3,4-tetramethyl-1,4,5,6-tetrahydropyrimidinium, 1,2,3,5-tetramethyl-1,4,5,6-tetrahydropyrimidinium, 1-methylquinuclidine, 1-ethylquinuclidine, 1-(2-hydroxyethyl)quinuclidine, 8-methyl-1,8-diazabicyclo[5.4.0]-7-undecenium, 5-methyl-1,5-diazabicycdo[4.3.0]-5-nonenium, 8-ethyl-1,8-diazabicycdo[5.4.0]-7-undecenium, 5-ethyl-1,5-diazabicyclo[4.3.0]-5-nonenium.

The anion in $X^-$ may be any of an inorganic anion and an organic anion. Examples of the inorganic anion include halogen ions ($F^-$, $Cl^-$, $Br^-$, $I^-$), sulfonate anions ($HSO_4^-$, $SO_4^{2-}$), phosphate anions [$P(=O)(OH)_2(O^-)$, $P(=O)(OH)(O^-)_2$, $P(=O)(O^-)_3$], phosphonate anions [$HP(=O)(OH)(O^-)$, $HP(=O)(O^-)_2$], $PF_6^-$, $BF_4^-$; $AsF_6^-$, $SbF_6^-$, $ClO_4^-$, $AlF_4^-$; $AlCl_4^-$, $TaF_6^-$, $NbF_6^-$, $SiF_6^-$, $CN^-$, and $F(HF)n^-$ (n represents an integer of 1 to 4).

Examples of the organic anion include an organic carboxylate anion, an organic sulfonate anion, an organic phosphate anion, an organic phosphonate anion, a dicyanamide ion [$N^-(CN)_2$], an organic imide ion, an organic methide anion, an organic phosphorus anion, and an organoboron anion.

The organic carboxylate or sulfonate anion may be any of an aliphatic carboxylate or sulfonate anion, an aromatic carboxylate or sulfonate anion, and a heterocyclic carboxylate or sulfonate anion. In addition, the organic carboxylate or sulfonate anion may be an anion (polyvalent anion) of a polyvalent carboxylic acid or sulfonic acid, such as a dicarboxylic acid or a disulfonic acid. A preferred anion of the organic carboxylate anions is represented by the following formula (A1). In addition, a preferred anion of the organic sulfonate anions is represented by the following formula (A2).

  Formula (A1)

  Formula (A2)

In formulas (A1) and (A2), Rb represents a hydrogen atom, an alkyl group, a cycloalkyl group, an alkenyl group, an aryl group, or a heterocyclic group, and Rc represents an alkyl group, a cycloalkyl group, an alkenyl group, an aryl group, or a heterocyclic group.

The alkyl group, cycloalkyl group, alkenyl group, aryl group, and heterocyclic group in Rb and Rc are as defined for the alkyl group, cycloalkyl group, alkenyl group, aryl group, and heterocyclic group in Ra. In addition, these alkyl group, cycloalkyl group, alkenyl group, aryl group, and heterocyclic group optionally have a substituent, and examples of the substituent include the substituents given as examples in Ra.

Examples of the organic carboxylate anion include a formate anion, an acetate anion, a propionate anion, a butyrate anion, an isobutyrate anion, a valerate anion, an isovalerate anion, a pivalate anion, a laurate anion, a myristate anion, a palmitate anion, a stearate anion, a trifluoroacetate anion, a trichloroacetate anion, anions of amino acids (for example, anions of glycine, glutamine, glutamic acid, arginine, alginic acid, asparagine, aspartic acid, cysteine, proline, serine, tyrosine, valine, leucine, isoleucine, methionine, phenylalanine, tryptophan, histidine, threonine, and lysine), an acrylate anion, a methacrylate anion, a crotonate anion, an isocrotonate anion, an oleate anion, a cinnamate anion, a cyclopropanecarboxylate anion, a cyclopentanecarboxylate anion, a cyclohexanecarboxylate anion, a benzoate anion, a toluate anion, naphthalenecarboxylate anion, a nicotinate anion, an isonicotinate anion, a furoate anion, a thenoate anion, an oxalate mono- or dianion, a malonate mono- or dianion, a succinate mono- or dianion, a glutarate mono- or dianion, an adipate mono- or dianion, a pimelate mono- or dianion, a suberate mono- or dianion, an azelate mono- or dianion, a sebacate mono- or dianion, a maleate mono- or dianion, a fumarate mono- or dianion, a citraconate mono- or dianion, a mesaconate mono- or dianion, a phthalate mono- or dianion, a terephthalate mono- or dianion, an isophthalate mono- or dianion, a camphorate mono- or dianion, a 1,4-naphthalenedicarboxylate mono- or dianion, a trimellitate mono-, di-, or trianion, and a pyromellitate mono- to tetraanion, a mellitate mono- to hexanion.

Examples of the organic sulfonate anion include a methanesulfonate anion, an ethanesulfonate anion, a propanesulfonate anion, an octanesulfonate anion, a 2-ethylhexanesulfonate anion, a cyclohexanesulfonate anion, a benzenesulfonate anion, a toluenesulfonate anion, a naphthalenesulfonate anion, a 4,6-disulfo-1-naphthalenesulfonate mono-, di-, or trianion, and o-sulfobenzenecarboxylate mono- or dianion.

It is preferable that the organic phosphate or phosphonate anion be an anion represented by the following formula (A3).

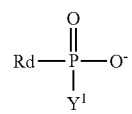  Formula (A3)

In formula (A3), Rd represents a hydrogen atom, an alkyl group, a cycloalkyl group, an alkenyl group, an aryl group, a heterocyclic group, an alkoxy group, or an aryloxy group, and $Y^1$ represents —O or —ORe. Re herein represents a hydrogen atom, an alkyl group, a cycloalkyl group, an alkenyl group, an aryl group, or a heterocyclic group.

The alkyl group, cycloalkyl group, alkenyl group, aryl group, heterocyclic group, alkoxy group, and aryloxy group in Rd are as defined for the alkyl group, cycloalkyl group, alkenyl group, aryl group, heterocyclic group, alkoxy group, and aryloxy group in Ra, and the alkyl group, cycloalkyl group, alkenyl group, aryl group, and heterocyclic group in Re are as defined for the alkyl group, cycloalkyl group, alkenyl group, aryl group, and heterocyclic group in Ra.

Examples of the organic phosphate or phosphonate anion include a methylphosphonate mono- or dianion, an ethylphosphonate mono- or dianion, a propylphosphonate mono- or dianion, a heptylphosphonate mono- or dianion, a hexylphosphonate mono- or dianion, a decylphosphonate mono- or dianion, an octylphosphonate mono- or dianion, a vinylphosphonate mono- or dianion, an aminomethylphosphonate mono- or dianion, a phenylphosphonate mono- or dianion, a methylenediphosphonate mono- to tetraanion, a nitrilotris(methylenephosphonate mono- to hexaanion), a 1,4-phenylenediphosphonate mono to tetraanion, a 4-phosphonobutyrate mono-, di-, or trianion, a p-xylenediphosphonate mono- to tetraanion, a monoethylphosphonate mono- or dianion, a diethylphosphate anion, a dibutylphosphate anion, a didecylphosphate anion, a diphenylphosphate anion, and a phenylphosphate mono- or dianion.

It is preferable that the organic imide ion, the organic methide anion, the organic phosphorus anion, and the organoboron anion be anions represented by the following formulas (A4) to (A7), respectively.

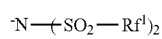 Formula (A4)

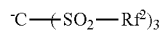 Formula (A5)

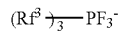 Formula (A6)

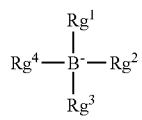 Formula (A7)

In formulas (A4) to (A7), $Rf^1$ to $Rf^3$ represent an alkyl group substituted with a fluorine atom or an aryl group substituted with a fluorine atom, two $Rf^1$s are optionally the same with or different from each other, three $Rf^2$s are optionally the same with or different from each other, and three $Rf^2$s are optionally the same with or different from each other. $Rg^1$ to $Rg^4$ each independently represent an alkyl group, a cycloalkyl group, or an aryl group.

It is preferable that the carbon numbers of the alkyl group substituted with a fluorine atom in $Rf^1$ to $Rf^3$ be 1 to 20, more preferably 1 to 12, still more preferably 1 to 8, and particularly preferably 1 or 2. The alkyl group substituted with a fluorine atom is an alkyl group substituted with at least one fluorine atom, and it is preferable that the alkyl group substituted with a fluorine atom be a perfluoroalkyl group. Examples of the alkyl group substituted with a fluorine atom include perfluoromethyl, perfluoroethyl, perfluoropropyl, perfluorobutyl, perfluoropentyl, perfluorohexyl, perfluorooctyl, perfluoro-2-ethylhexyl, difluoromethyl, 2,2,2-trifluoroethyl, 1,1-difluoroethyl, 1,1,2-trifluoroethyl, 1,1,2,2-tetrafluoroethyl, and perfluorobenzyl.

It is preferable that the carbon numbers of the aryl group substituted with a fluorine atom in $Rf^1$ to $Rf^3$ be 6 to 20, more preferably 6 to 12, still more preferably 6 to 10, and particularly preferably 6 to 8. The aryl group substituted with a fluorine atom is an aryl group substituted with at least one fluorine atom, and it is preferable that the aryl group substituted with a fluorine atom be a perfluoroaryl group. Examples of the aryl group substituted with a fluorine atom include perfluorophenyl, perfluorotolyl, and 2,6-dichloro-3,4,5-trifluorophenyl.

The alkyl group, cycloalkyl group, and aryl group in $Rg^1$ to $Rg^4$ are as defined for the alkyl group, cycloalkyl group, and aryl group in Ra. It is preferable that $Rg^1$ to $Rg^4$ each be an alkyl group or an aryl group, more preferably a C1 to 8 alkyl group, or a C6 to 16 aryl group. It is preferable that the aryl group be a phenyl group or a naphthyl group.

Examples of the above-described organoboron anion herein include the following anions.

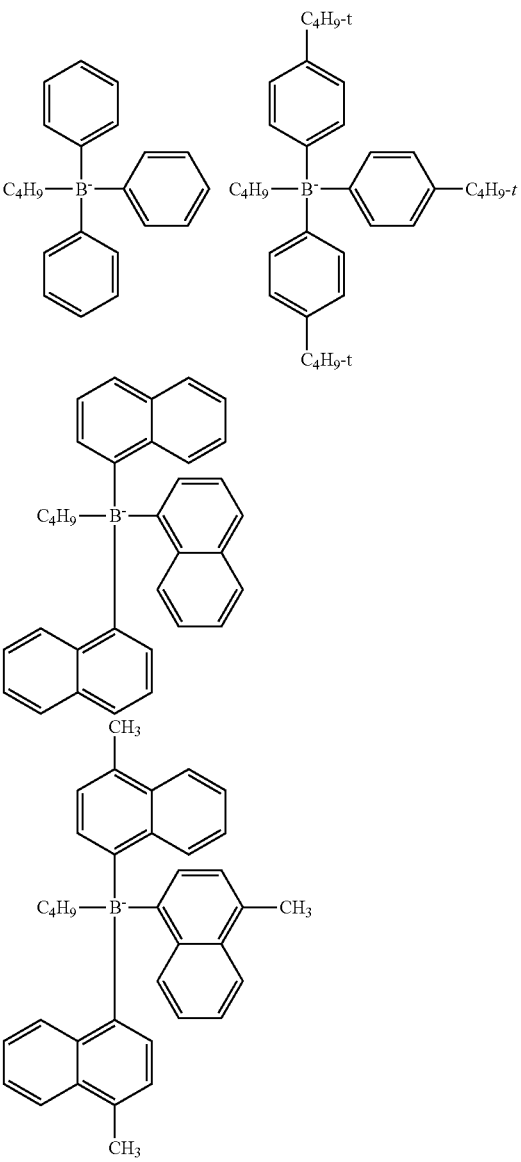

It is preferable that $X^-$ be a halogen ion, a carboxylate anion, a sulfonate anion, a phosphate anion, a phosphonate anion, a dicyanamide ion, or an anion represented by formula (A4), more preferably a halogen ion, a carboxylate anion, a sulfonate anion, a phosphate anion, a phosphonate anion, a dicyanamide ion, or a bis(trifluromethanesulfonyl)imide ion, particularly preferably a halogen ion or a carboxylate anion, and most preferably a carboxylate anion.

Examples of the ionic compound include a quaternary phosphonium salt in addition to the compound represented by the formula (1) or (2), and the quaternary phosphonium salt is preferable also in the present disclosure. Examples of the quaternary phosphonium of the quaternary phosphonium salt include tetramethylphosphonium, tetraethylphosphonium, tetrabutylphosphonium, triethylmethylphosphonium, methyltributylphosphonium, and dimethyldiethylphosphium. It is preferable that the anion be the X⁻.

It is preferable that the compound represented by the formula (1) or (2) be a compound represented by any one of the following formulas (1a), (1b) and (2a) to (2c).

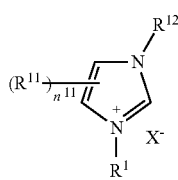

Formula (1a)

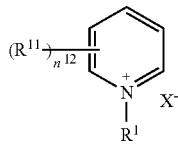

Formula (1b)

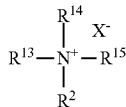

Formula (2a)

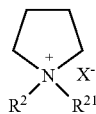

Formula (2b)

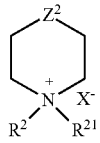

Formula (2c)

$R^1$, $R^2$, and X⁻ in formulas (1a), (1b), and (2a) to (2c) are as defined for $R^1$, $R^2$, and X⁻ in the formula (1) or (2), and preferred ranges thereof are also the same. $R^{11}$ and $R^{12}$ each independently represent a substituent. $n^{11}$ represents an integer of 0 to 3, and $n^{12}$ represents an integer of 0 to 5. When two or more $R^{11}$ exist herein, a plurality of $R^{11}$ are optionally the same with or different from each other. In addition, at least two $R^{11}$ are optionally bonded to each other to form a ring. $R^{13}$ to $R^{15}$ each independently represent an alkyl group, an alkenyl group, a cycloalkyl group, an aryl group, or a heterocyclic group. However, there is not a case where at least two of $R^2$ and $R^{13}$ to $R^{15}$ are bonded to each other to form a ring. $R^{21}$ is as defined for $R^2$, and preferred ranges thereof are also the same. $Z^2$ represents a single bond, a methylene group, —C(=O)—, —O—, —S—, —S(=O)—, —SO₂—, —N(Rα1)-, or —N⁺(Rα1)(Rα2)-, wherein Rα1 represents a hydrogen atom or a substituent, and Rα2 represents a substituent. Rα1 and Rα2 herein are optionally bonded to each other to form a ring.

The substituent in $R^{11}$ and of $R^{12}$ are as defined for Ra. $R^1$ is as defined for $R^1$ in formula (1) and preferred ranges thereof are also the same. $R^2$ is as defined for $R^2$ in formula (2) and preferred ranges thereof are also the same. $R^{23}$ to $R^{15}$ are as defined for $R^3$ to $R^5$ in formula (2) and preferred ranges thereof are also the same, except that there is not a case where two or more of $R^{13}$ to $R^{15}$ are bonded to each other to form a ring in formula (2).

Examples of the substituent in Rα1 include the substituents given as examples in Ra, and it is preferable that the substituent in Rα1 be an alkyl group, an alkenyl group, a cycloalkyl group, an aryl group, a heterocyclic group, an acyl group, or a sulfonyl group, more preferably an alkyl group, an alkenyl group, a cycloalkyl group, an aryl group, or a heterocyclic group, and still more preferably an alkyl group, an alkenyl group, a cycloalkyl group, or an aryl group. The substituent in Rα2 is as defined for the substituent in Rα1, and preferred ranges thereof are also the same.

It is preferable that the ring formed in such a way that at least two $R^{11}$ are bonded to each other be a 5- or 6-membered ring, more preferably a benzene ring or a hetero ring, still more preferably a benzene ring or a hetero aromatic ring, and particularly preferably a benzene ring.

It is preferable that the ring formed in such a way that Rα1 and Rα2 are bonded to each other be a 5- or 6-membered ring, more preferably a nitrogen-containing saturated ring, and still more preferably a pyrrolidine ring, a piperidine ring, a piperazine ring, a morpholine ring, or a thiomorpholine ring.

It is preferable that $R^{11}$ and $R^{12}$ each be an alkyl group, and it is preferable that $R^{13}$ to $R^{15}$, $R^2$, and $R^{21}$ each be an alkyl group, or an aryl group, more preferably an alkyl group. In addition, it is preferable that $R^1$ and $R^{12}$ be alkyl groups each having different carbon numbers.

In the present disclosure, among the compounds represented by formulas (1a), (1b), and (2a) to (2c), the compound represented by the formula (1a), (1b), or (2a) is preferable, the compound represented by formula (1a) or (2a) is more preferably used, and the compound represented by formula (1a) is still more preferably used.

Examples of the ionic compound to be used in the present disclosure include the following ionic liquids. Examples thereof include 1-butyl-3-methylimidazolium acetate, 1-butyl-3-methylimidazolium chloride, 1-butyl-3-methylimidazolium bromide, 1-butyl-3-methylimidazolium dicyanamide, 1-ethyl-3-methylimidazolium bis(trifluoromethylsulfonyl)imide, 1-butyl-3-methylimidazolium bis(trifluoromethylsulfonyl)imide, 1-hexyl-3-methylimidazolium bis(trifluoromethylsulfonyl)imide, 1-octyl-3-methylimidazolium bis(trifluoromethylsulfonyl)imide, 1-propyl-2,3-dimethylimidazolium bis(trifluoromethylsulfonyl)imide, 1-butyl-2,3-dimethylimidazolium bis(trifluoromethylsulfonyl)imide, N,N-diethyl-N-methyl-N-(2-methoxyethyl)ammonium bis(trifluoromethylsulfonyl)imide, 1-ethyl-3-methylimidazolium tris(trifluoromethylsulfonyl)methide, 1-butyl-3-methylimidazolium tris(trifluoromethylsulfonyl)methide, 1-hexyl-3-methylimidazolium tris(trifluoromethylsulfonyl)methide, 1-octyl-3-methylimidazolium tris(trifluoromethylsulfonyl)methide, 1-propyl-2,3-dimethylimidazolium tris(trifluoromethylsulfonyl)methide, 1-butyl-2,3-dimethylimidazolium tris(trifluoromethylsulfonyl)methide, N,N-diethyl-N-methyl-N-(2-methoxyethyl)ammonium tris(trifluoromethylsulfonyl)methide, 1-ethyl-3-methylimidazolium tris(pentafluoroethyl)trifluorophosphate, 1-butyl-3-methylimidazolium tris(pentafluoroethyl)trifluorophosphate, 1-hexyl-3-methylimidazolium tris(pentafluoroethyl)trifluorophosphate, 1-octyl-3-methylimidazolium tris(pentafluoroethyl)trifluorophosphate, 1-propyl-2,3-dimethylimidazolium tris(pentafluoroethyl)trifluorophosphate, 1-butyl-2,3-dimethylimidazolium tris(pentafluoroethyl)trifluorophosphate, N,N-diethyl-N-methyl-N-(2- methoxyethyl)ammonium tris(pentafluoroethyl)trifluorophosphate, 1-ethyl-3-methylimidazolium hexafluorophosphate, 1-butyl-3-methylimidazolium hexafluorophosphate, 1-hexyl-3-methylimidazolium hexafluorophosphate, 1-octyl-3-methylimidazolium hexafluorophosphate, 1-propyl-2,3-dimethylimidazolium hexafluorophosphate, 1-butyl-2,3-dimethylimidazolium hexafluorophosphate, N,N-diethyl-N-methyl-N-(2-methoxyethyl)ammonium hexafluorophosphate, 1-ethyl-3-methylimidazolium butyltriphenylborate, 1-butyl-3-methylimidazolium butyltris(4-t-butylphenyl)borate, 1-hexyl-3-methylimidazolium butyltris(1-naphthyl)borate, 1-octyl-3-methylimidazolium butyltris(4-methylnaphthalen-1-yl)borate, 1-propyl-2,3-dimethylimidazolium butyltriphenylborate, 1-butyl-2,3-dimethylimidazolium hexyltris(4-t-butylphenyl)borate, N,N-diethyl-N-methyl-N-(2-methoxyethyl)ammonium 2-ethylhexyltriphenylborate, 1-butylpyridinium hexafluorophosphate, 1-hexylpyridinium hexafluorophosphate, 1-ethyl-3-methylimidazolium tris(pentafluoroethyl)trifluorophosphate, 1-cyanomethyl-3-methylimidazolium bis(trifluoromethylsulfonyl)imide, N-hexyl-4-dimethylaminopyridinium bis(trifluoromethylsulfonyl)imide, 1-(2-hydroxyethyl)-3-methylimidazolium bis(trifluoromethylsulfonyl)imide, N-(3-hydroxypropyl)pyridinium bis(trifluoromethylsulfonyl)imide, N-ethyl-N,N-dimethyl-2-methoxyethylammonium tris(pentafluoroethyl)trifluorophosphate, 1-(2-hydroxyethyl)-3-methylimidazolium tris(pentafluoroethyl)trifluorophosphate, N-(3-hydroxypropyl)pyridinium tris(pentafluoroethyl)trifluorophosphate, N-(methoxyethyl)-N-methylmorpholium tris(pentafluoroethyl)trifluorophosphate, 1-(2-methoxyethyl)-1-methyl-pyrrolidinium tris(pentafluoroethyl)trifluorophosphate, 1-(methoxyethyl)-1-methylpiperidinium tris(pentafluoroethyl)trifluorophosphate, 1-(methoxyethyl)-1-methyl-piperidinium bis(trifluoromethylsulfonyl)imide, N-(methoxyethyl)-1-methylpyrrolidinium bis(trifluoromethylsulfonyl)imide, and N-(methoxyethyl)-N-methylmorpholium bis(trifluoromethylsulfonyl)imide.

It is to be noted that as the ionic compound including the ionic liquid, those commercially available can also be used. Examples of such compounds include the following ionic liquids.

1) Non-Water-Miscible Ionic Liquids

1-Ethyl-3-methylimidazolium bis(trifluoromethylsulfonyl)imide, 1-propyl-2,3-dimethylimidazolium bis(trifluoromethylsulfonyl)imide, 1-butyl-3-methylimidazolium bis(trifluoromethylsulfonyl)imide, and 1-propyl-2,3-dimethylimidazolium tris(trifluoromethylsulfonyl)methide [all commercially available from Covalent Associates Inc.], N,N-diethyl-N-methyl-N-(2-methoxyethyl)ammonium bis(trifluoromethylsulfonyl)imide, 1-hexyl-3-methylimidazolium bis(trifluoromethylsulfonyl)imide, 1-octyl-3-methylimidazolium bis(trifluoromethylsulfonyl)imide, 1-ethyl-2,3-dimethylimidazolium bis(trifluoromethylsulfonyl)imide, and 1-butyl-2,3-dimethylimidazolium bis(trifluoromethylsulfonyl)imide [all commercially available from KANTO CHEMICAL CO., INC.].

2) Water-Miscible Ionic Liquids

N,N-Diethyl-N-methyl-N-(2-methoxyethyl)ammonium tetrafluoroborate, and 1-ethyl-3-methylimidazolium acetate [all commercially available from KANTO CHEMICAL CO., INC.], 1-methyl-3-propylimidazolium iodide [commercially available from Tokyo Chemical Industry Co., Ltd.], and 1-ethyl-3-methylimidazolium trifluoroacetate [commercially available from Merck KGaA].

The ionic compound may be used singly, or two or more thereof may be used together. In the present disclosure, the content of the ionic compound is 0.001 times or more and less than 1.000 times, preferably 0.01 times or more and less than 1.000 times, more preferably 0.01 to 0.8 times, still more preferably 0.01 to 0.8 times, and particularly preferably 0.05 to 0.7 times the content of the cellulose in terms of mass ratio.

The ionic compound is a salt of an anionic component and a cationic component, and there exist ionic substances, when being in a liquid state, which exhibits a solution characteristic of dissolving the cellulose completely because of a high affinity with a cellulose molecule. With respect to the interaction between the ionic compound and the cellulose molecule, it is proposed that dissolution into the ionic compound occurs by a mechanism such that the ionic compound acts on a hydroxyl group (hydroxy group), which the cellulose molecule has, to cut a hydrogen bond formed by hydroxyl groups of cellulose molecules, and thereby penetrates between the cellulose molecules, as reported in, for example, Green Chem., 2015, 17, 694-714.

Therefore, when the content of the ionic compound is 1.000 times the mass of the cellulose, crystals in the cellulose dissolve, resulting in bringing about deterioration in modulus of elasticity. Conversely, when the content of the ionic compound is less than 0.001 times the mass of the cellulose, most of the strong hydrogen bonds between cellulose molecules remains left, and therefore the deterioration in modulus of elasticity does not occur, but micronization of the cellulose cannot be brought about by only the shear stress in a processing machine. As described herein, it is important to achieve both of the micronization of the cellulose in a processing machine and, in micronized cellulose, an improvement in mechanical characteristics obtained when a strong hydrogen bond between cellulose molecules is formed.

<Additional Additive>

The thermoplastic resin composition of the present disclosure can contain, in addition to those described above, an additional additive component, such as an antioxidizing agent, a light stabilizer, a radical scavenger, an ultraviolet ray absorber, a colorant (dye, organic pigment, inorganic pigment), a filler, a lubricant, a plasticizer, a processing aid such as an acrylic processing aid, a foaming agent, a lubricating agent such as paraffin wax, a surface treatment agent, a crystal nucleating agent, a mold-releasing agent, a hydrolysis-preventing agent, an antiblocking agent, an antistatic agent, an antifogging agent, an antifungal agent, an ion-trapping agent, a flame retardant, and a flame retardant auxiliary, within a range where the above-described object is not impaired.

Examples of the antioxidizing agent or a deterioration-preventing agent include a phenol-based antioxidizing agent, a phosphorus-based antioxidizing agent, a sulfur-based antioxidizing agent, a hydroxylamine-based antioxidizing agent, and an amine-based antioxidizing agent, and as the phenol-based antioxidizing agent, a hindered phenol-based compound having a t-alkyl group at an ortho position is preferable.

Examples of the phenol-based antioxidizing agent include tetrakis[methylene-3(3',5'-di-t-butyl-4-hydroxyphenyl)propionate]methane, octadecyl-3-(3,5-di-t-butyl-4-hydroxyphenyl)propionate, 3,9-bis[2-{3-(3-t-butyl-4-hydroxy-5-methylphenyl)propionyloxy}-1,1-dimethylethyl]-2,4,8,10-tetraoxaspiro[5.5]undecane, triethylene glycol-N-bis-3-(3-t-butyl-5-methyl-4-hydroxyphenyl)propionate, 1,6-hexanediolbis[3-(3,5-di-t-butyl-4-hydroxyphenyl)propionate], and 2,2-thiobis-diethylenebis[3-(3,5-di-t-butyl-4-hydroxyphenyl)propionate], more preferably, 3,9-bis[2-

(3-(3-t-butyl-4-hydroxy-5-methylphenyl)propionyloxy)-1,1-dimethylethyl]-2,4,8,10-tetraoxaspiro[5.5]undecane, lauryl-3,5-t-butyl-4-hydroxybenzoate, palmityl-3,5-t-butyl-4-hydroxybenzoate, stearyl-3,5-t-butyl-4-hydroxybenzoate, behenyl-3,5-t-butyl-4-hydroxybenzoate, 2,4-di-t-butyl-phenyl-3,5-di-t-butyl-4-hydroxybenzoate, and tocopherols.

Examples of the phosphorus-based antioxidizing agent include tris(nonylphenyl) phosphite, tris(2,4-di-t-butylphenyl) phosphite, distearyl pentaerythritol diphosphite, bis(2,4-di-t-butylphenyl) pentaerythritol diphosphite, bis(2,4-di-t-butyl-6-methylphenyl) pentaerythritol diphosphite, bis(2,6-di-t-butyl-4-methylphenyl) pentaerythritol diphosphite, bis(2,4-dicumylphenyl) pentaerythritol diphosphite, tetrakis(2,4-di-t-butylphenyl)-4,4'-diphenylene diphosphonite, 2,2'-methylenebis(4,6-di-t-butylpheny) 2-ethylhexyl phosphite, 2,2'-ethylidenebis(4,6-di-t-butylphenyl) fluorophosphite, bis(2,4-di-t-butyl-6-methylphenyl) ethyl phosphite, 2-(2,4,6-tri-t-butylphenyl)-5-ethyl-5-butyl-1,3,2-oxaphosphorinane, 2,2',2'-nitrilo[triethyl-tris(3,3',5,5'-tetra-t-butyl-1,1'-biphenyl-2,2'-diyl) phosphite, and 2,4,8,10-tetra-t-butyl-6-[3-(3-methyl-4-hydroxy-5-t-butylphenyl)propoxy]dibenzo[d,f][1,3,2] dioxaphosphepin.

Examples of the sulfur-based antioxidizing agent include dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetrayl tetrakis(3-laurylthiopropionate), and bis[2-methyl-4-(3-n-alkyl (alkyl having 12 to 14 carbon atoms) thiopropionyloxy)-5-t-butylphenyl]sulfide.

Examples of the light stabilizer include a hindered amine light stabilizer (light stabilizer having a 2,2,6,6-tetramethylpiperidine skeleton in a molecule) having a molecular weight of 1000 or more.

Examples of the ultraviolet ray absorber include a benzotriazole-based compound, a triazine-based compound, a benzophenone-based compound, a salicylate-based compound, a cyanoacrylate-based compound, and a nickel-based compound.

Examples of the colorant include carbon black, an inorganic pigment, and an organic pigment. Examples of the carbon black include furnace black, channel black, acetylene black, and lamp black. Examples of the inorganic pigment include iron black, red iron oxide, titanium oxide, cadmium red, cadmium yellow, ultramarine blue, cobalt blue, titanium yellow, red lead, yellow lead, and Prussian blue. Examples of the organic pigment include quinacridone, polyazo yellow, anthraquinone yellow, polyazo red, azo lake yellow, perylene, phthalocyanine green, phthalocyanine blue, and isoindolinone yellow. These colorants may be used singly, or two or more thereof may be used together.

Preferred examples of the filler include a metal compound such as silica, hydroxyapatite, alumina, titania, boehmite, talc, or calcium carbonate.

<<Method for Producing Thermoplastic Resin Composition>>

Micronization of cellulose is first performed in a thermoplastic resin containing the cellulose and the ionic compound.

When the thermoplastic resin composition is produced, the content of the cellulose may be made 1 to 100 parts by mass based on 100 parts by mass of the thermoplastic resin, and the content of the ionic compound may be made 0.001 times or more and less than 1.000 times the content of the cellulose by compounding each of the thermoplastic resin, the cellulose, and the ionic compound. The method of adding the ionic compound for the purpose of performing the micronization of the cellulose is not particularly limited, and examples thereof include a method of impregnating an ionic liquid with the cellulose in advance, or a method of adding the ionic compound at the time of kneading the thermoplastic resin and the cellulose. It is preferable to prepare a mixture of the cellulose and the ionic compound, namely a cellulose composition, and to compound this cellulose composition and the thermoplastic resin. Therefore, a step of preparing the cellulose composition having a content of the ionic compound of 0.1% by mass or more and less than 50% by mass is performed. The amount of the cellulose composition to be compounded or the total amount of the cellulose and the ionic compound to be compounded is made such that the content of the cellulose is 1 to 100 parts by mass based on 100 parts by mass of the thermoplastic resin.

The ionic compound herein, such as, for example, a halogen anion (chlorine anion in particular), absorbs moisture into a liquid state in some cases depending on the storage state. In such a case, it is preferable to use the ionic compound that has been made into a solid state at normal temperature by evaporating water through vacuum drying.

Cellulose has a strong intermolecular bonding force due to hydrogen bonds by hydroxyl groups in the molecule. It is considered that the ionic compound cuts the hydrogen bonds between cellulose molecules. Moreover, it is considered that the anionic component among the components of the ionic compound directly acts on a hydrogen atom of the hydroxyl group which the cellulose molecule has, and therefore it is inferred that the structure of the anionic component greatly affects on the ability of dissolving the cellulose. Cellulose itself has a strong intermolecular bonding force, as described above, and therefore the micronization cannot be allowed to progress by only the shear stress in a processing machine. Therefore, when the ionic compound weakens the intermolecular bonding force of the cellulose partially, the ionic compound thereby enables the micronization to progress.

Each of the thermoplastic resin; the cellulose composition or the cellulose; and the ionic compound is compounded to perform a step of performing processing-by-kneading, and in this step, the cellulose is micronized. In this processing-by-kneading step, it is preferable to perform kneading in a processing machine at a stage of performing processing and molding by extrusion, injection, or the like.

It is desirable that the kneading temperature be at least equal to or higher than the melting point of the ionic compound and that the temperature at which thermal decomposition of the cellulose occurs little be set to the upper limit. Accordingly, the lower limit temperature changes according to the type of the ionic compound, but it is preferable that the upper limit temperature be 300° C. or less, more preferably 250° C. or less, and still more preferably 230° C. or less. With respect to stirring in the kneading, it is preferable to assemble a screw configuration that can secure sufficient kneadability by disposing a kneading disk appropriately in a screw shaft direction, or by other methods, and to perform kneading at a number of rotations of a screw (usually, in a range of about 100 to about 300 rpm) capable of obtaining necessary production quantity. As the apparatus for performing processing-by-kneading, an apparatus of a same direction twin-screw system is preferable, and examples thereof include a twin-screw extruder [KZW15TW-45MGNH manufactured by TECHNOVEL CORPORATION]. However, the apparatus for performing processing-by-kneading is not limited to the same direction twin-screw extruder and may be of any system, such as a single-screw extruder, a different direction twin-screw extruder, multi-screw extruder of triple-screw or more, a batch type kneader (such as a kneader and a Banbury), as long as a sufficient kneadability is obtained and the effects which are the same as the effects of the present disclosure are obtained.

<<Molded Article and Method for Producing Molded Article>>

A resin part of a molded article of the present disclosure contains: a thermoplastic resin; cellulose; and an ionic compound, wherein the content of the cellulose is 1 to 100 parts by mass based on 100 parts by mass of the thermoplastic resin, and the content of the ionic compound is 0.001 times or more and less than 1.000 times the content of the cellulose. The molded article of the present disclosure is, for example, a lamp body of a lighting appliance, a speaker unit, a connection box, a connector, a pulley, or a film for a house. Such molded article is provided with a resin part molded using a thermoplastic resin composition, especially a thermoplastic resin composition produced by the method for producing a thermoplastic resin composition, and when the molded article is a film for a house, the film for a house includes a layer formed with the thermoplastic resin composition.

<Lamp Body of Lighting Appliance>

FIG. 1 is a schematic sectional diagram showing an example of a lamp body of a lighting appliance according to an embodiment of the molded article. In FIG. 1, a configuration of a headlight (headlamp) as a lighting appliance for a vehicle is shown as an example of a lighting appliance 100. The lighting appliance 100 includes a lamp body 101, a front cover 102, a light source 103, a reflection mirror (reflector) 104, and a socket part 105. The lamp body 101 includes an opening 111 at the front. The front cover 102 is attached to the lamp body 101 in such a way as to cover the opening 111 of the lamp body 101. Thereby, a space 110 closed up tightly by the lamp body 101 and the front cover 102 is formed.

The light source 103 and the reflection mirror 104 are disposed in the space 110. The light source 103 is, for example, a LED light bulb or a halogen light bulb. The light source 103 is connected to the socket part 105 fixed in a through hole 112 formed in the lamp body 101 and emits light by electric power supplied from the socket part 105.

The reflection mirror 104 includes a concave surface 140 dented toward the front cover 102. A hole is formed at the central part of the reflection mirror 104, and the light source 103 is inserted and fixed in the hole. The reflection mirror 104 reflects the light emitted from the light source 103 by the concave surface 140 to lead the light on the side of the front cover 102.

The front cover 102 is formed from a light (visible light)-transmittable resin material. The front cover 102 also functions as a lens that condenses or diffuses light from the light source 103.

The lamp body 101 herein is provided with a resin part formed with the above-described thermoplastic resin composition. Thereby, weight reduction and high strengthening of the lamp body 101 can be achieved.

The method of producing the lamp body 101 is not particularly limited, and the lamp body 101 can be molded by injection molding of injecting the thermoplastic resin composition into a metal mold. Thereby, the resistance against wear of a metal mold is improved, and a metal mold is made difficult to corrode.

FIG. 1 shows an example of a case where the whole of the lamp body 101 is formed by the resin part, but the lamp body 101 is not limited to this and may include the resin part and a part formed with a material other than a resin. In addition, FIG. 1 shows an example of a case where the lighting appliance 100 is a headlight; however, the lighting appliance 100 is not limited to this, and the lamp body 101 can be applied as a lamp body of a lighting appliance for a vehicle, such as a brake lamp, a fog lamp, and a reversing light. Further, the lamp body 101 can be applied as a body part (housing) of various lighting appliances, not limited to the lighting appliance for a vehicle.

<Speaker Unit>

Figure 2:
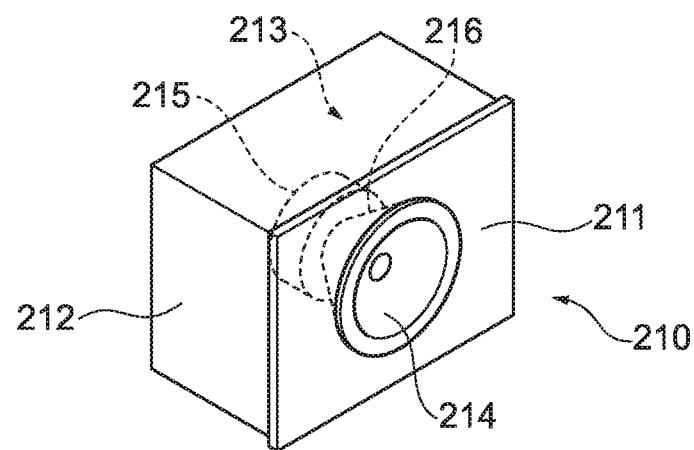
FIG. 2 is a perspective diagram showing an example of a speaker unit according to an embodiment of a molded article of the present disclosure.

FIG. 2 is a perspective diagram showing an example of a speaker unit according to an embodiment of the molded article. A speaker unit 210 is provided with: an almost tightly-closed case body (enclosure) 213 formed by a board-like baffle 211 and a box-like storing part 212 bonded to the back of the baffle 211; and a speaker 214 held by the case body 213 in such a way as to expose a sound-emitting surface to the surface of the baffle 211. It is to be noted that the case body (enclosure) 213 is also generally called a speaker box or a cabinet and has various shapes, such as a box type, a cylindrical type, and a conical type, depending on an apparatus or the like to which the case body 213 is applied. The speaker 214 includes: an exciter 215 as a source of vibration for a magnetic circuit; and cone paper 216 that releases a sound wave generated by the vibration of the exciter 215 outside the case body 213.

Figure 3:
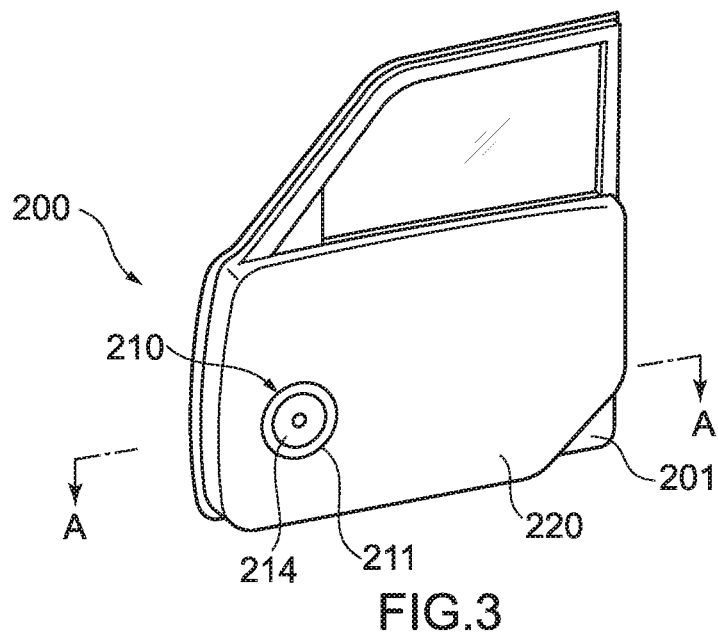
FIG. 3 is a perspective diagram showing an aspect of applying a speaker unit according to an embodiment of a molded article of the present disclosure to a speaker apparatus for automotive application.
Figure 4:
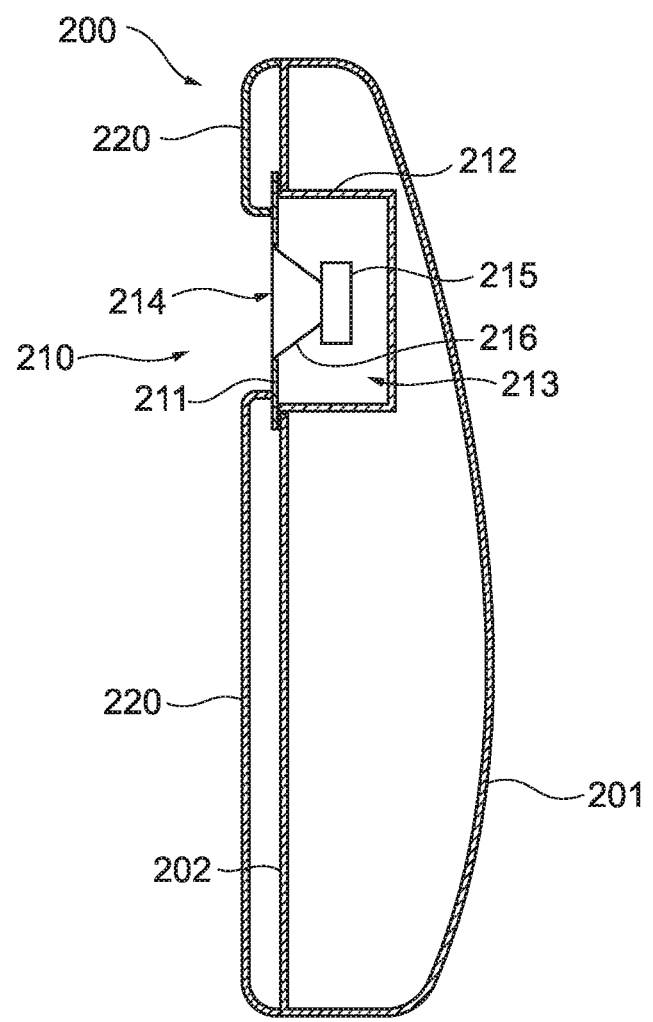
FIG. 4 is a sectional diagram of the speaker apparatus for automotive application shown in FIG. 3, the sectional diagram viewed from the arrow direction along the line A-A in FIG. 3.

FIG. 3 is a perspective diagram showing a speaker apparatus 200 for automotive application, which is an embodiment of applying the speaker unit to a speaker apparatus for automotive application. FIG. 4 is a sectional diagram of the speaker apparatus 200 for automotive application shown in FIG. 3, the sectional diagram viewed from the arrow direction along the line A-A in FIG. 3. As shown in FIGS. 3 and 4, the speaker unit 210 to be used as the speaker apparatus 200 for automotive application is provided between an outer panel 201 on the vehicle outer side and an inner panel 202 on the vehicle inner side, the panels forming a door in a vehicle, such as an automobile, and is attached in a state where the speaker unit 210 is exposed from the opening of the inner panel 202. It is to be noted that to the inner panel 202, an inner trim 220 covering the surface of the inner panel 202 is attached in a state of exposing the speaker unit 210.

In the speaker unit 210 used for the speaker apparatus 200 for automotive application shown in FIGS. 2 to 4, the above-described thermoplastic resin composition is used for the baffle 211, the storing part 212, and the cone paper 216 of the case body 213. Thereby, weight reduction and improvements in strength characteristics and acoustic characteristics can be achieved in the speaker apparatus 200 for automotive application. The speaker unit 210 in particular can contribute to reducing fuel consumption of a vehicle due to the weight reduction and is made highly strong, and therefore vibration of the case body 213 caused by vibration of a vehicle can be suppressed. As a result, noise attributable to the vibration of the case body 213 can be reduced and the acoustic characteristics can be improved. In addition, the above-described thermoplastic resin composition is used for the speaker unit 210, and therefore the speaker unit 210 exhibits an excellent whitening resistance. Further, the speaker unit 210 includes a highly strong case body 213 formed with the thermoplastic resin composition and therefore is rich in recyclability.

The object of applying the speaker unit is not limited to an automobile, and examples thereof include mobile objects such as a two-wheeled vehicle, a railroad vehicle, a plane, and a ship, a computer apparatus, a headphone, or all the speaker apparatuses to be installed for home-use.

<Connection Box and Connector>

Figure 5:
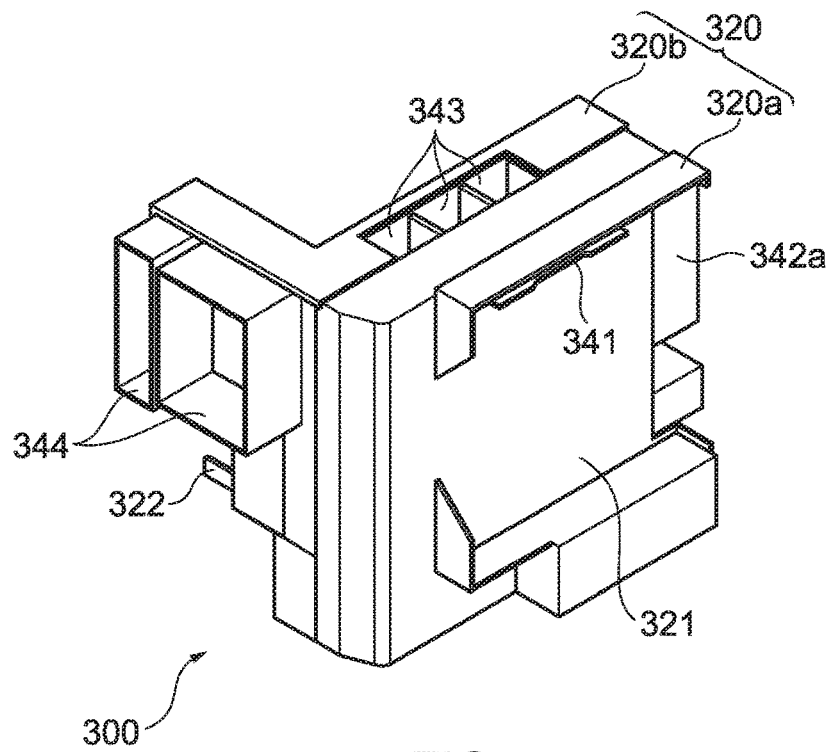
FIG. 5 is a perspective diagram showing an example of a connection box according to an embodiment of a molded article of the present disclosure.
Figure 6:
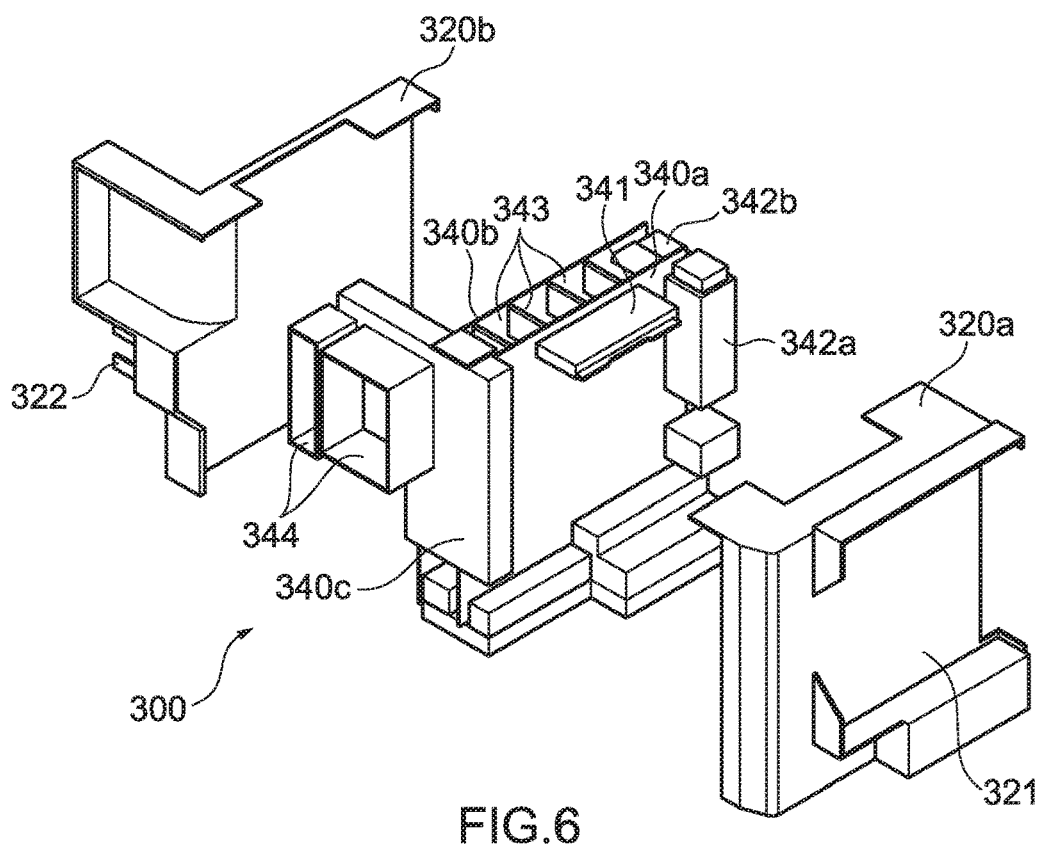
FIG. 6 is a disassembled perspective diagram of the connection box shown in FIG. 5.

FIG. 5 is a perspective diagram showing a connection box according to an embodiment of the molded article. FIG. 6 is a disassembled perspective diagram of the connection box shown in FIG. 5. A connection box 300 is formed, for example, as a junction box to be installed on the indoor side of an automobile. This connection box 300 is provided with a case 320 including a first case 320a and a second case 320b.

The connection box 300 is provided with a first substrate 340a, a second substrate 340b, and a third substrate 340c in the accommodating space inside thereof. The first substrate 340a and the second substrate 340b are disposed in such a way as to be in parallel with each other, and the third substrate 340c is disposed in such a way as to be vertically connected to end portions of the first substrate 340a and the second substrate 340b.

On a mounting surface 321 of the first case 320a, an electronic control unit (ECU: Electronic Control Unit) not shown in the figures is to be installed. A connector 341 for ECU of the first substrate 340a is disposed in such a way as to protrude from the mounting surface 321 and can electrically connect the circuit of the first substrate 340a to ECU.

From the end portion of the second case 320b, a connector 322 for mounting a relay, the connector integrated with the case 320 of the connection box 300, protrudes. A relay not shown in the figures can be mounted to the connector 322 for mounting a relay.

An indoor side connector 342a is disposed on the first substrate 340a, and an indoor side connector 342b is disposed on the second substrate 340b. These indoor side connectors 342a, 342b are each electrically connected to a circuit on the indoor side of an automobile through a wire harness not shown in the figures. A connector 343 for mounting a relay is disposed on the second substrate 340b. In the example shown in the figures, three relays can be loaded to the connector 343 for mounting a relay. An engine room side connector 344 is disposed on the third substrate 340c. This engine room side connector 344 is to be electrically connected to a circuit on the engine room side through a wire harness not shown in the figures.

In this way, the case 320 and connectors 322, 341 to 344 of the connection box 300 are formed using the thermoplastic resin composition, and therefore weight reduction and high strengthening can be achieved, and recyclability can be improved.

The method of producing the connection box and the connector is not particularly limited, and the connection box and the connector can be molded by injection molding of injecting the thermoplastic resin composition into a metal mold. It is to be noted that the connector in the present disclosure includes a connector housing, the connector itself, a connector integrated with a connection box case, and the like.

Examples of the uses of the connection box and the connector include a material for transportation equipment, such as an automobile, a two-wheeled vehicle, a train, and an airplane, a structural member of a robot arm, parts for a robot for amusement, a material for a home electric appliance, a case body for office automation equipment, information processing equipment, and a portable terminal.

<Pulley>

Figure 7:
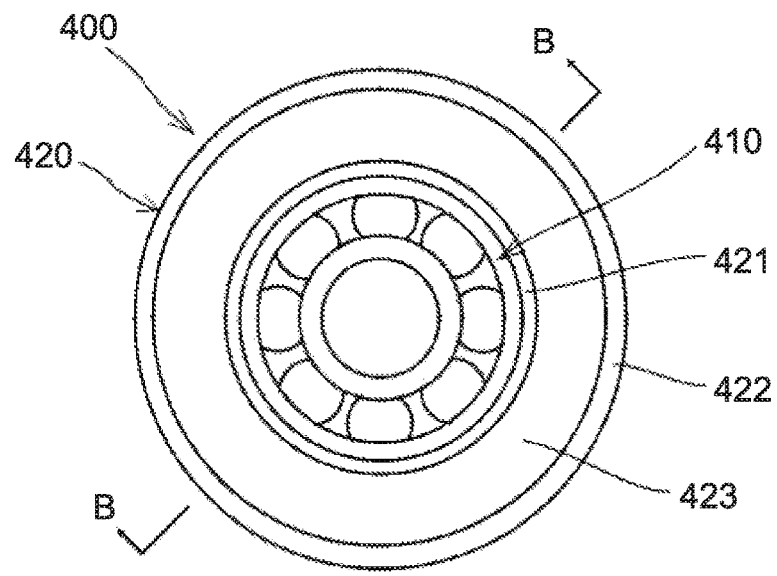
FIG. 7 is a front diagram showing an example of a pulley according to an embodiment of a molded article of the present disclosure.
Figure 8:
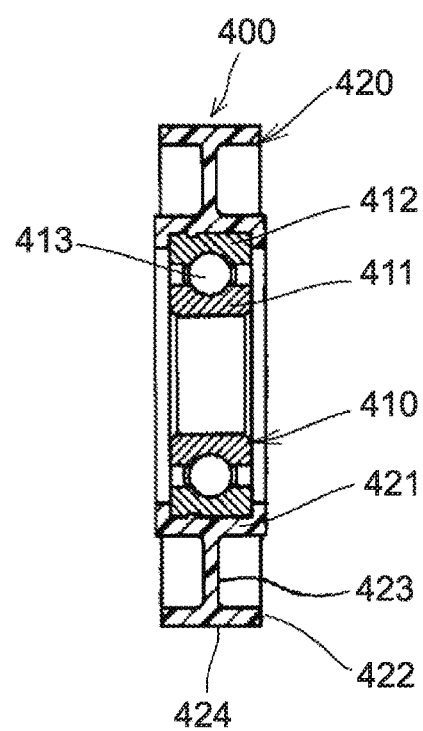
FIG. 8 is a sectional diagram of the pulley shown in FIG. 7, the sectional diagram taken along the line B-B in FIG. 7.

FIG. 7 shows a front diagram of a pulley according to an embodiment of the molded article, and FIG. 8 shows a sectional diagram of FIG. 7, the sectional diagram taken along the line B-B in FIG. 7. As shown in FIGS. 7 and 8, a pulley 400 is formed by a rolling bearing 410 and a resin part 420 integrally molded around the rolling bearing 410. The rolling bearing 410 includes an inner ring 411, an outer ring 412, and a rolling element 413 provided between the inner and outer rings. The resin part 420 is formed using the thermoplastic resin composition. The resin part 420 is provided with a cylindrical boss 421, a cylindrical rim 422, and an annular part 423 that connects the boss 421 and the rim 422. The outer peripheral surface 424 of the rim 422 is a guide surface of a belt not shown in the figures.

FIG. 7 shows an example where the resin part 420 is formed using the thermoplastic resin composition, but the whole pulley may be formed using the thermoplastic resin composition. This can contribute to weight reduction and high strengthening of the pulley 400. The method of producing the pulley 400 is not particularly limited, but the pulley 400 can be molded by injection molding of disposing the rolling bearing 410 in a metal mold and injecting the thermoplastic resin composition into the metal mold. Thereby, the resistance against wear of a metal mold and the smoothness of the edge (sharp-edge characteristic) of the resin part 420 can be improved. In addition, by performing injection molding using the thermoplastic resin composition, a pulley 400 excellent in size accuracy can be molded.

Examples of the use of the pulley include a material for transportation equipment, such as an automobile, a two-wheeled vehicle, a train, and an airplane, a structural member of a robot arm, parts for a robot for amusement, a material for a home electric appliance, a case body for office automation equipment, information processing equipment, and a portable terminal.

<Film for House>

Figure 9:
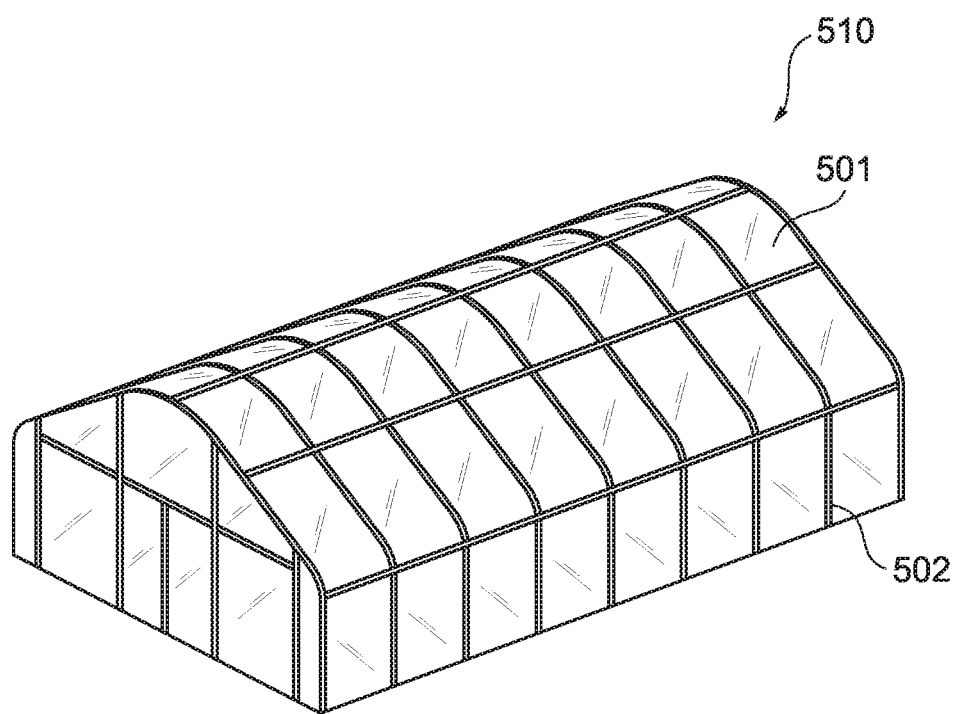
FIG. 9 is a perspective diagram showing an example of a house for agriculture using a film for a house according to an embodiment of a molded article of the present disclosure.

FIG. 9 is a schematic perspective diagram showing an example of an appearance of an agricultural house to which a film for a house according to an aspect of the molded article is applied. As shown in FIG. 9, a house 510 for agriculture is provided with a film 501 stretched over a skeleton 502.

As shown in FIG. 9, the whole surface of the house 510 for agriculture is covered with the film 501 stretched over the skeleton 502. When the film 501 is stretched over the skeleton, the house for agriculture in which a space separated from the outside is thereby formed can be made.

The material forming the skeleton 502 is not particularly limited, and a conventionally known aggregate (such as, for example, steel material and steel pipe) for use in a plastic greenhouse can be used. The film 501 is a film to be stretched over the skeleton 502, and the above-described film for a house is applied to the film 501.

The house 510 for agriculture may be provided with ventilation means (not shown in the figure), such as, for example, a ventilation fan, to be provided at the ceiling or the side of a house. In addition, it is preferable that the doorway (not shown in the figure) for a worker who is engaged in work in the house 510 for agriculture be, for example, double-entry doors or the like such that the air outside cannot directly get into the space in the house.

The film 501 in the house 510 for agriculture includes a layer which is formed using the thermoplastic resin composition. Thereby, the film 501 possesses recyclability together with weight reduction and high strengthening, and further, the surface smoothness and the adhesion performance can be improved more than a conventional film.

The film 501 (film for a house) may include a layer which is formed from the thermoplastic resin composition and can be produced by a known method, such as, for example, an inflation molding method, a T-die molding method, a lamination method, and a calender method.

The film 501 (film for a house) may be a single-layered or multi-layered film including one layer or a plurality of layers which is or are formed using the thermoplastic resin composition, or a laminated film in which on a layer formed from the thermoplastic resin composition, a resin layer formed from another resin composition is laminated. Examples of the resin capable of forming the other resin layer which can be laminated on the layer formed from the thermoplastic resin composition include a polyolefin resin which is usually used for a use as a film for a house.

The thickness of the layer which is formed from the thermoplastic resin composition, the layer included in the film 501 (film for a house) is, for example, 50 μm or more and 200 μm or less, the lower limit value is preferably 75 μm or less, and it is preferable that the upper limit value be 150 μm or less. When the film for a house is a multi-layered film, the thickness of the film for a house can appropriately be set according to the use or the like.

FIG. 9 shows an example of a case where the film 501 (film for a house) is applied to the whole surface of the house 510 for agriculture, but the house 510 for agriculture is not limited to this and may be such that the film for a house is used in some of the surfaces of the house 510 for agriculture. In addition, the house 510 for agriculture can be prepared in such a way that a framework is built in desired width, depth, and height, and the film 501 (film for a house) is prepared using the above-described thermoplastic resin composition is stretched over the skeleton 502. Thereby, a house 510 for agriculture which is reduced in weight and highly strengthened and is excellent in recyclability can be obtained.

Examples of the use of the film for a house include a house for gardening, a house for raising a living thing, a house for a terrace, and a simple warehouse, not limited to a house for agriculture, the house for cultivating plants.

EXAMPLES

Hereinafter, the present disclosure will be described in more detail based on Examples, but the present disclosure is not limited to these Examples. The materials used are shown below.

<Materials Used>
(1) Thermoplastic Resin
 Thermoplastic resin A: high density polyethylene [MFR=5 g/10 min (190° C./2.16 kg), density=0.953 g/cm$^3$]
 Thermoplastic resin B: ethylene-propylene copolymer [content by percentage of ethylene of 16% by mass, MFR (190° C./2.16 kg)=1.4 g/10 min, density=0.862 g/cm$^3$]
 Thermoplastic resin C: ethylene-octene copolymer [MFR=1.0 g/10 min (190° C./2.16 kg), density=0.870 g/cm$^3$]
(2) Cellulose
 Cellulose A: KC FLOCK W-200 [trade name, manufactured by Nippon Paper Industries Co., Ltd., powdered cellulose having an average particle diameter of about 32 Gm]
 Cellulose B: LIGNOCEL C-120 [trade name, manufactured by J. RETTENMAIER & SÖHNE GmbH+Co KG, particle diameters of 70 to 150 μm]
(3) Ionic Compound
 Ionic compound A: 1-butyl-3-methylimidazolium acetate (melting point: −20° C. or lower)
 Ionic compound B: 1-butyl-3-methylimidazolium chloride (melting point: −70° C.)
 Ionic compound C: 1-butyl-3-methylimidazolium dicyanamide (melting point: −6° C.)

Example 1

A cellulose-reinforced thermoplastic resin was prepared by the following steps.

1) Step of Preparing Cellulose Composition

In an acetone solvent, 90 parts by mass of cellulose A was dispersed, and after 10 parts by mass of ionic compound A was mixed therein, a resultant mixture was left to stand for 12 hours or more in a container which a lid was put on while the mixture was being agitated every several hours. The lid of the container was then opened to dry the acetone solvent, and after the acetone solvent evaporated almost completely, the container was stored further in a thermostatic chamber of 80° C. for 12 hours or more for drying moisture.

2) Step of Kneading Cellulose Composition and Thermoplastic Resin (Production of Cellulose-Reinforced Thermoplastic Resin Composition)

A cellulose-reinforced thermoplastic resin composition was produced by performing extrusion in such a way that while thermoplastic resin B was being fed to a twin-screw extruder [KZW15TW-45MG-NH manufactured by TECHNOVEL CORPORATION] at an outlet temperature of 150° C. and at a rate of 300 g/hour, the cellulose composition prepared above was fed by the second feeder at a rate of 300 g/hour. On that occasion, the number of rotations of screws was set to 100 rpm. In this extrusion process, the thermoplastic resin B and the cellulose A are kneaded, so that the cellulose is dispersed and the cellulose fiber is thereby micronized. In addition, it is considered that the micronization further progresses also in the following preparation step of 3). It is to be noted that even if the micronization is insufficient in this kneading step of 2), micronization can be done by performing the following preparation step of 3).

3) Step of Preparing Cellulose-Reinforced Thermoplastic Resin Composition Containing Thermoplastic Resin A The cellulose-reinforced thermoplastic resin composition, in which the cellulose fiber micronized by the above-described extrusion is dispersed in the thermoplastic resin B, and the thermoplastic resin A were dry-blended such that the thermoplastic resin A:the thermoplastic resin B was made 78:22 in terms of mass ratio with a twin-screw extruder [KZW15TW-45MG-NH manufactured by TECHNOVEL CORPORATION] to prepare and produce a cellulose-reinforced thermoplastic resin composition containing two types of thermoplastic resins. On that occasion, the cellulose-reinforced resin thermoplastic resin composition was prepared while feeding was being performed at a rate of 1000 g/hour setting the outlet temperature of the twin-screw extruder to 190° C. On that occasion, the number of rotations of screws was set to 100 rpm. It is considered that also in this preparation step, the micronization of the cellulose fiber is further progressing.

4) Step of Producing Lamp Body

A lamp body was prepared by performing injection molding using the cellulose-reinforced thermoplastic resin composition prepared in 3). It is to be noted that with respect to injection conditions, injection molding was carried out under the conditions which are generally regarded as suitable in injection molding of a lamp body.

Example 2

A cellulose-reinforced thermoplastic resin composition obtained in 2), the cellulose-reinforced thermoplastic resin composition containing one type of thermoplastic resin, was produced without performing the step of 3) in Example 1. Thereafter, a lamp body was prepared using this cellulose-reinforced thermoplastic resin composition in the same manner as in the step of 4) in Example 1.

Example 3

A cellulose-reinforced thermoplastic resin composition containing two types of thermoplastic resins was prepared and produced in the same manner as in Example 2, except that 0.1 parts by mass of the ionic compound A based on 99.9 parts by mass of the cellulose A was compounded in the step of 1) in Example 1, and a resin obtained by mixing the thermoplastic resins A and B in such a way as to be 499:1 in terms of mass ratio was used in place of the thermoplastic resin B in the step of 2). Thereafter, a lamp body was prepared using this cellulose-reinforced thermoplastic resin composition in the same manner as in the step of 4) in Example 1.

Example 4

A cellulose-reinforced thermoplastic resin composition containing one type of thermoplastic resin was produced in the same manner as in Example 2, except that 49.9 parts by mass of the ionic compound A based on 50.1 parts by mass of the cellulose A was compounded in the step of 1) in Example 1. Thereafter, a lamp body was prepared using this cellulose-reinforced thermoplastic resin composition in the same manner as in the step of 4) in Example 1.

Example 5

A cellulose-reinforced thermoplastic resin composition containing two types of thermoplastic resins was produced in the same manner as in Example 1, except that dry blend was performed such that the mass ratio of the thermoplastic resin B:the cellulose composition was made 100:60 in the step of 2) in Example 1, and the thermoplastic resin A was dry-blended such that the thermoplastic resin A:the thermoplastic resin B was made 98:2 in terms of mass ratio in the step of 3) in Example 1. Thereafter, a lamp body was prepared using this cellulose-reinforced thermoplastic resin composition in the same manner as in the step of 4) in Example 1.

Example 6

A cellulose-reinforced thermoplastic resin composition containing two types of thermoplastic resins was produced in the same manner as in Example 1, except that the type of ionic compound in the step of 1) in Example 1 was changed to the ionic compound B. Thereafter, a lamp body was prepared using this cellulose-reinforced thermoplastic resin composition in the same manner as in the step of 4) in Example 1.

Example 7

A cellulose-reinforced thermoplastic resin composition containing two types of thermoplastic resins was produced in the same manner as in Example 1, except that the type of ionic compound in the step of 1) in Example 1 was changed to the ionic compound C. Thereafter, a lamp body was prepared using this cellulose-reinforced thermoplastic resin composition in the same manner as in the step of 4) in Example 1.

Example 8

A cellulose-reinforced thermoplastic resin composition containing one type of thermoplastic resin was produced in the same manner as in Example 1, except that 11 parts by mass of the cellulose composition based on 100 parts by mass of the thermoplastic resin A was compounded in the step of 2) in Example 1, and the step of 3) was not performed. Thereafter, a lamp body was prepared using this cellulose-reinforced thermoplastic resin composition in the same manner as in the step of 4) in Example 1.

Example 9

A cellulose-reinforced thermoplastic resin composition containing one type of thermoplastic resin was produced in the same manner as in Example 8, except that the type of cellulose in the step of 1) in Example 1 was changed to the cellulose B. Thereafter, a lamp body was prepared using this cellulose-reinforced thermoplastic resin composition in the same manner as in the step of 4) in Example 1.

Example 10

A cellulose-reinforced thermoplastic resin composition containing two types of thermoplastic resins was produced in the same manner as in Example 1, except that: the thermoplastic resin C was used in place of the thermoplastic resin B, and the mass ratio of the thermoplastic resin C:the cellulose composition was 90:100 in the step of 2) in Example 1; and in the step of 3) in Example 1, the cellulose-reinforced thermoplastic resin composition, in which the cellulose is dispersed in the thermoplastic resin C, and the thermoplastic resin A were dry-blended such that the thermoplastic resin A: the cellulose-reinforced thermoplastic resin composition, in which the cellulose is dispersed in the thermoplastic resin C, was made 260:190 in terms of mass ratio. Thereafter, a lamp body was prepared using this cellulose-reinforced thermoplastic resin composition in the same manner as in the step of 4) in Example 1.

Example 11

A cellulose-reinforced thermoplastic resin composition containing two types of thermoplastic resins was produced in the same manner as in Example 10, except that: 30 parts by mass of the ionic compound A based on 70 parts by mass of the cellulose A was compounded in the step of 1) in Example 1; the mass ratio of the thermoplastic resin C:the cellulose composition was 70:100 in the step of 2) in Example 1; and in the step of 3) in Example 1, the cellulose-reinforced thermoplastic resin composition, in which the cellulose is dispersed in the thermoplastic resin C, and the thermoplastic resin A were dry-blended such that the thermoplastic resin A: the cellulose-reinforced thermoplastic resin composition, in which the cellulose is dispersed in the thermoplastic resin C, was made 180:170 in terms of mass ratio. Thereafter, a lamp body was prepared using this cellulose-reinforced thermoplastic resin composition in the same manner as in the step of 4) in Example 1.

Example 12

A cellulose-reinforced thermoplastic resin composition containing two types of thermoplastic resins was produced in the same manner as in Example 10, except that: 49.9 parts by mass of the ionic compound A based on 50.1 parts by mass of the cellulose A was compounded in the step of 1) in Example 1; the mass ratio of the thermoplastic resin C:the cellulose composition was 50:100 in the step of 2) in Example 1; and in the step of 3) in Example 1, the cellulose-reinforced thermoplastic resin composition, in which the cellulose is dispersed in the thermoplastic resin C, and the thermoplastic resin A were dry-blended such that the thermoplastic resin A: the cellulose-reinforced thermoplastic resin composition, in which the cellulose is dispersed in the thermoplastic resin C, was made 100:150 in terms of mass ratio. Thereafter, a lamp body was prepared using this cellulose-reinforced thermoplastic resin composition in the same manner as in the step of 4) in Example 1.

Comparative Example 1

In the step of 1) in Example 1, 70 parts by mass of an ionic compound A based on 30 parts by mass of the cellulose A was compounded. In this case, the powdered cellulose dissolved, and the cellulose recrystallized partially in the acetone solvent, causing difficulty in handling properties because the cellulose lysate which became highly viscous liquid after being dried was dung, or other reasons, thus, in the step of 2), an obtained composition was pelletized using LABO PLASTOMILL [Kneading/Extrusion Molding Evaluation Tester LABO PLASTOMILL/MICRO manufactured by Toyo Seiki Seisaku-sho, Ltd.] instead of the twin-screw extruder to prepare and produce a thermoplastic resin composition. In addition, a cellulose-reinforced thermoplastic resin composition containing two types of thermoplastic resins was produced in the same manner as in the step of 3) in Example 1, except that in the step of 3), the thermoplastic resin A was dry-blended such that the thermoplastic resin A:the thermoplastic resin B was made 50:50 in terms of mass ratio. Thereafter, a lamp body provided with a resin part was prepared using this cellulose-reinforced thermoplastic resin composition in the same manner as in the step of 4) in Example 1.

Comparative Example 2

A cellulose-reinforced thermoplastic resin composition containing one type of thermoplastic resin was prepared and produced in the same manner as in Example 2, except that the thermoplastic resin A was used in place of the thermoplastic resin B, and the cellulose composition was compounded in a ratio of 112 parts by mass of the cellulose composition to 100 parts by mass of the thermoplastic resin A in the step of 2) in Example 1. Thereafter, a lamp body provided with a resin part was prepared using this cellulose-reinforced thermoplastic resin composition in the same manner as in Example 1.

Comparative Example 3

A cellulose-reinforced thermoplastic resin containing one type of thermoplastic resin was prepared and produced in such a way that: the cellulose A itself was used in place of the cellulose composition without performing the step of 1) in Example 1; and 11.1 parts by mass of the cellulose A based on 100 parts by mass of the thermoplastic resin A was compounded in the step of 2) in Example 1 to perform extrusion with a twin-screw extruder [KZW15TW-45MG-NH manufactured by TECHNOVEL CORPORATION]. Thereafter, a lamp body provided with a resin part was prepared using this cellulose-reinforced thermoplastic resin composition in the same manner as in the step of 4) in Example 1.

Example 13

A cellulose-reinforced thermoplastic resin composition was prepared by performing the steps of 1) to 3) in Example 1 in the same manner as in Example 1.

5) Step of Producing Speaker Unit

Injection molding was performed using the cellulose-reinforced thermoplastic resin composition prepared above to prepare a speaker unit provided with a resin part. It is to be noted that with respect to injection conditions, injection molding was carried out under the molding conditions which are generally regarded as suitable in injection molding of a speaker unit.

Examples 14 to 24

Speaker units each provided with a resin part were each prepared using each of the cellulose-reinforced thermoplastic resin compositions produced in Examples 2 to 12 in the same manner as in the step of 5) in Example 13.

Comparative Example 4

A speaker unit provided with a resin part was prepared using the cellulose-reinforced thermoplastic resin composition produced in Comparative Example 1 in the same manner as in the step of 5) in Example 13.

Comparative Example 5

A speaker unit provided with a resin part was prepared using the cellulose-reinforced thermoplastic resin composition produced in Comparative Example 2 in the same manner as in the step of 5) in Example 13.

Comparative Example 6

A speaker unit provided with a resin part was prepared using the cellulose-reinforced thermoplastic resin composition produced in Comparative Example 3 in the same manner as in the step of 5) in Example 13.

Example 25

A cellulose-reinforced thermoplastic resin composition was prepared by performing the steps of 1) to 3) in Example 1 in the same manner as in Example 1.

6) Step of Producing Connection Box and Connector

Injection molding was performed using the cellulose-reinforced thermoplastic resin composition prepared above to prepare a connection box and a connector each provided with a resin part. It is to be noted that with respect to injection conditions, injection molding was carried out under the conditions which are generally regarded as suitable in injection molding of a connection box and a connector.

Examples 26 to 36

Connection boxes and connectors each provided with a resin part were each prepared using each of the cellulose-reinforced thermoplastic resin compositions produced in Examples 2 to 12 in the same manner as in the step of 6) in Example 25.

Comparative Example 7

A connection box and a connector each provided with a resin part were prepared using the cellulose-reinforced thermoplastic resin composition produced in Comparative Example 1 in the same manner as in the step of 6) in Example 25.

Comparative Example 8

A connection box and a connector each provided with a resin part were prepared using the cellulose-reinforced thermoplastic resin composition produced in Comparative Example 2 in the same manner as in the step of 6) in Example 25.

Comparative Example 9

A connection box and a connector each provided with a resin part were prepared using the cellulose-reinforced thermoplastic resin composition produced in Comparative Example 3 in the same manner as in the step of 6) in Example 25.

Example 37

A cellulose-reinforced thermoplastic resin composition was prepared by performing the steps of 1) to 3) in Example 1 in the same manner as in Example 1.
7) Step of Producing Pulley
Injection molding was performed using the cellulose-reinforced thermoplastic resin composition prepared above to prepare a pulley provided with a resin part. It is to be noted that with respect to injection conditions, injection molding was carried out under the conditions which are generally regarded as suitable in injection molding of a pulley.

Examples 38 to 48

Pulleys each provided with a resin part were each prepared using each of the cellulose-reinforced thermoplastic resin compositions produced in Examples 2 to 12 in the same manner as in the step of 7) in Example 37.

Comparative Example 10

A pulley provided with a resin part was prepared using the cellulose-reinforced thermoplastic resin composition produced in Comparative Example 1 in the same manner as in the step of 7) in Example 37.

Comparative Example 11

A pulley provided with a resin part was prepared using the cellulose-reinforced thermoplastic resin composition produced in Comparative Example 2 in the same manner as in the step of 7) in Example 37.

Comparative Example 12

A pulley provided with a resin part was prepared using the cellulose-reinforced thermoplastic resin composition produced in Comparative Example 3 in the same manner as in the step of 7) in Example 37.

Example 49

A cellulose-reinforced thermoplastic resin composition was prepared by performing the steps of 1) to 3) in Example 1 in the same manner as in Example 1.
8) Step of Producing Film for House
A single-layered film having a thickness of 100 μm was prepared to obtain a film for a house by molding the cellulose-reinforced thermoplastic resin composition prepared above into a film using a T-die cast film production apparatus at an extruding temperature of 200° C.

Examples 50 to 60

Films for a house were each prepared using each of the cellulose-reinforced thermoplastic resin compositions produced in Examples 2 to 12 in the same manner as in the step of 8) in Example 49.

Comparative Example 13

A film for a house was prepared using the cellulose-reinforced thermoplastic resin composition produced in Comparative Example 1 in the same manner as in the step of 8) in Example 49.

Comparative Example 14

A film for a house was prepared using the cellulose-reinforced thermoplastic resin composition produced in Comparative Example 2 in the same manner as in the step of 8) in Example 49.

Comparative Example 15

A film for a house was prepared using the cellulose-reinforced thermoplastic resin composition produced in Comparative Example 3 in the same manner as in the step of 8) in Example 49.

In each Example and Comparative Example prepared and produced in the manner as described above, the short side lengths of the cellulose fibers existing in the cellulose-reinforced thermoplastic resin composition and the areas of the aggregates were measured in the following manners.

(Measurement of Short Side Length of Cellulose Fiber)

Each cellulose-reinforced thermoplastic resin composition was immersed in liquid nitrogen and was broken by applying external force in a state of a brittle temperature or lower, and a fracture surface was exposed. A reflected electron image of this fracture surface was observed with an electron microscope to measure the short side lengths of the cellulose fibers. While 200 cellulose fibers were randomly counted, an existence ratio of the number of cellulose fibers having a short side length of 2 μm or less was also determined. When this ratio is 15% or more, it is shown that the cellulose fibers are micronized, and this means that the modulus of elasticity is improved, and the efficiency of reinforcing a thermoplastic resin is high.

(Measurement of Area of Cellulose Aggregate)

Each cellulose-reinforced thermoplastic resin composition was preheated at 160° C. for 5 minutes and press-molded under a condition of pressurization for 5 minutes under a pressure of 20 MPa to prepare a sheet having a thickness of about 0.1 mm. An image of the sheet thus prepared was taken at 50-fold magnification with a microscope for industrial application "ECLIPSE LV100ND" manufactured by NIKON CORPORATION. A part counted as having a brightness of 0 to 80 in the taken image was defined as an aggregate of cellulose. The area of a visual field is 1.3 mm×1.7 mm, the visual field is denoted as n1, and 9 visual fields were randomly observed. The areas of the cellulose aggregates were calculated by performing image analysis of the obtained parts each counted as having a brightness of 0 to 80 with "NIS-Elements D" manufactured by NIKON CORPORATION. A case where all of the areas of the cellulose aggregates calculated in nine visual fields were less than 20000 μm² is an acceptable level to be a target, and a case where any one of them is 20000 μm² or more is an unacceptable level. In Tables 1 to 10, the maximum area and the minimum area in the cellulose aggregates in the 9 visual fields are described as "maximum value" and "minimum value" respectively. That all of the areas of the cellulose aggregates are less than 20000 μm² shows that the cellulose fibers are micronized without aggregation even when the cellulose fibers are micronized and means that the modulus of elasticity of the cellulose fibers is further improved in addition to the short side lengths of the cellulose fibers, and the efficiency of reinforcing a thermoplastic resin is high.

<Appearance of Molded Article>

The molded article prepared in each Example or Comparative Example was visually observed to evaluate the uniformity of cellulose dispersion by the existence or non-existence of an aggregate of a cellulose fiber. When the aggregate of the cellulose fiber does not exist, it can be concluded that a molded article which is reduced in weight and highly strengthened, the molded article excellent in size accuracy with respect to a lamp body and a pulley, the molded article excellent in acoustic characteristics with respect to a speaker unit, the molded article excellent in recyclability with respect to a connection box and a connector, or the molded article excellent in recyclability, and further, excellent in surface smoothness and adhesion performance with respect to a film for a house, was obtained.

(Measurement of Apparent Modulus of Elasticity of Cellulose Contained in Thermoplastic Resin Composition)

In each cellulose-reinforced thermoplastic resin composition produced, the apparent modulus of elasticity of the cellulose contained in each cellulose-reinforced thermoplastic resin composition was measured in the following manner.

A test specimen for a flexure test (4 mm in thickness×80 mm in length) was prepared by performing injection molding using each produced cellulose-reinforced thermoplastic resin composition. It is to be noted that with respect to injection conditions, the injection molding was carried out under molding conditions which are generally regarded as suitable. The modulus of elasticity in flexure was calculated following JIS K 7171. The density was determined in accordance with JIS K 7112, but ethanol was used as a solvent for measurement instead of water. The volume fraction of each component of the resins and the cellulose was calculated from the obtained density. The density and modulus of elasticity of only the resins are separately calculated by JIS K 7112 and JIS K 7171. The apparent modulus of elasticity Ef of the cellulose was determined from equation (2.2) obtained by transforming the following equation (2.1). It is to be noted that Em was determined from the following equation (4.1) based on the compound rule assuming formula (4.2). Among obtained results, the results obtained in Example 8 and Comparative Example 3 are shown as representatives in Table 11 described below.

$$Ec = EmVm + EfVf \quad (2.1)$$

$$Ef = \{Ec - Em(1 - Vf)\}/Vf \quad (2.2)$$

$$Em = \sum_{p=1}^{n} EpVp \quad (4.1)$$

$$\sum_{p=1}^{n} Vp = 1 \quad (4.2)$$

Ec herein represents Young's modulus (modulus of elasticity) of the test specimen for a flexure test, which is a composite material, Em represents Young's modulus (modulus of elasticity) of the thermoplastic resins which are mother materials, and Ef represents Young's modulus (modulus of elasticity) of the cellulose which is a fiber. Vm represents a volume ratio of the thermoplastic resins which are mother materials, and Vf represents a volume ratio of the cellulose which is a fiber. These volume ratios are determined from the density. Ep represents Young's modulus (modulus of elasticity) of a component p, Vp represents a volume ratio of a component p and is determined from the density. It is to be noted that 1 to n components exist, and n represents the maximum value of the number of existing components.

Obtained results are shown together in Tables 1 to 11 below. Herein, the thermoplastic resin and the cellulose composition in each table are expressed by parts by mass, and the "-" shows that the thermoplastic resin or the cellulose composition is not used, namely 0 parts by mass. In addition, the cellulose and the ionic compound, which are breakdowns of the cellulose composition, are each expressed by the proportion of parts by mass thereof. The "-" as well as the above-described "-" shows that the cellulose or the ionic compound is not used, namely 0 parts by mass. On the other hand, the "-" in the measurement results shows that the item is unmeasurable and therefore is not evaluated. It is to be noted that A or B in the cellulose composition shows that the cellulose used is A or B.

TABLE 1

| Composition | | | Example 1 | Example 2 | Example 3 | Example 4 | Example 5 | Example 6 | Example 7 | Example 8 | Example 9 |
|---|---|---|---|---|---|---|---|---|---|---|---|
| Thermoplastic resin | | A | 78 | — | 99.8 | — | 98 | 78 | 78 | 100 | 100 |
| | | B | 22 | 100 | 0.2 | 100 | 2 | 22 | 22 | — | — |
| | | C | — | — | — | — | — | — | — | — | — |
| Cellulose composition | | A | 11 | 100 | 100 | 100 | 1.2 | 11 | 11 | 11 | — |
| | | B | — | — | — | — | — | — | — | — | 11 |
| Breakdown | Cellulose | | 90 | 90 | 99.9 | 50.1 | 90 | 90 | 90 | 90 | 90 |
| | Ionic compound | A | 10 | 10 | 0.1 | 49.9 | 10 | — | — | 10 | 10 |
| | | B | — | — | — | — | — | 10 | — | — | — |
| | | C | — | — | — | — | — | — | 10 | — | — |
| Existence ratio of cellulose of 2 μm or less (%) | | | 22.9 | 22 | 17.9 | 37.8 | 23.7 | 18.8 | 20.9 | 16.8 | 16.1 |
| Areas of aggregates of cellulose (μm²) | Maximum value | | 16993 | 18897 | 19121 | 5798 | 15911 | 17111 | 16143 | 16555 | 17530 |
| | Minimum value | | 504 | 501 | 503 | 503 | 517 | 505 | 504 | 502 | 503 |

TABLE 1-continued

| Composition | Example 1 | Example 2 | Example 3 | Example 4 | Example 5 | Example 6 | Example 7 | Example 8 | Example 9 |
|---|---|---|---|---|---|---|---|---|---|
| Appearance of molded article (existence or non-existence of fiber aggregate) | None | None | None | None | None | None | None | None | None |

TABLE 2

| Composition | | | Example 10 | Example 11 | Example 12 | Comparative Example 1 | Comparative Example 2 | Comparative Example 3 |
|---|---|---|---|---|---|---|---|---|
| Thermoplastic resin | A | | 74.3 | 72 | 66.7 | 50 | 100 | 100 |
| | B | | — | — | — | 50 | — | — |
| | C | | 25.7 | 28 | 33.3 | — | — | — |
| Cellulose composition | A | | 28.6 | 40 | 66.7 | 25 | 112 | 11 |
| | B | | — | — | — | — | — | — |
| Breakdown | Cellulose | | 90 | 70 | 50.1 | 30 | 90 | 100 |
| | Ionic compound | A | 10 | 30 | 49.9 | 70 | 10 | — |
| | | B | — | — | — | — | — | — |
| | | C | — | — | — | — | — | — |
| Existence ratio of cellulose of 2 μm or less (%) | | | 25.6 | 35.4 | 48.3 | — | 14.4 | 4.6 |
| Areas of aggregates of cellulose (μm²) | Maximum value | | 15578 | 14480 | 7231 | — | 25411 | 144374 |
| | Minimum value | | 505 | 502 | 507 | — | 501 | 504 |
| Appearance of molded article (existence or non-existence of fiber aggregate) | | | None | None | None | — | Exists | Exists |

TABLE 3

| Composition | | | Example 13 | Example 14 | Example 15 | Example 16 | Example 17 | Example 18 | Example 19 | Example 20 | Example 21 |
|---|---|---|---|---|---|---|---|---|---|---|---|
| Thermoplastic resin | A | | 78 | — | 99.8 | — | 98 | 78 | 78 | 100 | 100 |
| | B | | 22 | 100 | 0.2 | 100 | 2 | 22 | 22 | — | — |
| | C | | — | — | — | — | — | — | — | — | — |
| Cellulose composition | A | | 11 | 100 | 100 | 100 | 1.2 | 11 | 11 | 11 | — |
| | B | | — | — | — | — | — | — | — | — | 11 |
| Breakdown | Cellulose | | 90 | 90 | 99.9 | 50.1 | 90 | 90 | 90 | 90 | 90 |
| | Ionic compound | A | 10 | 10 | 0.1 | 49.9 | 10 | — | — | 10 | 10 |
| | | B | — | — | — | — | — | 10 | — | — | — |
| | | C | — | — | — | — | — | — | 10 | — | — |
| Existence ratio of cellulose of 2 μm or less (%) | | | 22.9 | 22 | 17.9 | 37.8 | 23.7 | 18.8 | 20.9 | 16.8 | 16.1 |
| Areas of aggregates of cellulose (μm²) | Maximum value | | 16993 | 18897 | 19121 | 5798 | 15911 | 17111 | 16143 | 16555 | 17530 |
| | Minimum value | | 504 | 501 | 503 | 503 | 517 | 505 | 504 | 502 | 503 |
| Appearance of molded article (existence or non-existence of fiber aggregate) | | | None | None | None | None | None | None | None | None | None |

TABLE 4

| Composition | | | Example 22 | Example 23 | Example 24 | Comparative Example 4 | Comparative Example 5 | Comparative Example 6 |
|---|---|---|---|---|---|---|---|---|
| Thermoplastic resin | A | | 74.3 | 72 | 66.7 | 50 | 100 | 100 |
| | B | | — | — | — | 50 | — | — |
| | C | | 25.7 | 28 | 33.3 | — | — | — |
| Cellulose composition | A | | 28.6 | 40 | 66.7 | 25 | 112 | 11 |
| | B | | — | — | — | — | — | — |
| Breakdown | Cellulose | | 90 | 70 | 50.1 | 30 | 90 | 100 |
| | Ionic compound | A | 10 | 30 | 49.9 | 70 | 10 | — |
| | | B | — | — | — | — | — | — |
| | | C | — | — | — | — | — | — |

TABLE 4-continued

| Composition | | Example 22 | Example 23 | Example 24 | Comparative Example 4 | Comparative Example 5 | Comparative Example 6 |
|---|---|---|---|---|---|---|---|
| Existence ratio of cellulose of 2 μm or less (%) | | 25.6 | 35.4 | 48.3 | — | 14.4 | 4.6 |
| Areas of aggregates of cellulose (μm²) | Maximum value | 15578 | 14480 | 7231 | — | 25411 | 144374 |
| | Minimum value | 505 | 502 | 507 | — | 501 | 504 |
| Appearance of molded article (existence or non-existence of fiber aggregate) | | None | None | None | — | Exists | Exists |

TABLE 5

| Composition | | Example 25 | Example 26 | Example 27 | Example 28 | Example 29 | Example 30 | Example 31 | Example 32 | Example 33 |
|---|---|---|---|---|---|---|---|---|---|---|
| Thermoplastic resin | A | 78 | — | 99.8 | — | 98 | 78 | 78 | 100 | 100 |
| | B | 22 | 100 | 0.2 | 100 | 2 | 22 | 22 | — | — |
| | C | — | — | — | — | — | — | — | — | — |
| Cellulose composition | A | 11 | 100 | 100 | 100 | 1.2 | 11 | 11 | 11 | — |
| | B | — | — | — | — | — | — | — | — | 11 |
| Breakdown | Cellulose | 90 | 90 | 99.9 | 50.1 | 90 | 90 | 90 | 90 | 90 |
| | Ionic compound A | 10 | 10 | 0.1 | 49.9 | 10 | — | — | 10 | 10 |
| | B | — | — | — | — | — | 10 | — | — | — |
| | C | — | — | — | — | — | — | 10 | — | — |
| Existence ratio of cellulose of 2 μm or less (%) | | 22.9 | 22 | 17.9 | 37.8 | 23.7 | 18.8 | 20.9 | 16.8 | 16.1 |
| Areas of aggregates of cellulose (μm²) | Maximum value | 16993 | 18897 | 19121 | 5798 | 15911 | 17111 | 16143 | 16555 | 17530 |
| | Minimum value | 504 | 501 | 503 | 503 | 517 | 505 | 504 | 502 | 503 |
| Appearance of molded article (existence or non-existence of fiber aggregate) | | None | None | None | None | None | None | None | None | None |

TABLE 6

| Composition | | Example 34 | Example 35 | Example 36 | Comparative Example 7 | Comparative Example 8 | Comparative Example 9 |
|---|---|---|---|---|---|---|---|
| Thermoplastic resin | A | 74.3 | 72 | 66.7 | 50 | 100 | 100 |
| | B | — | — | — | 50 | — | — |
| | C | 25.7 | 28 | 33.3 | — | — | — |
| Cellulose composition | A | 28.6 | 40 | 66.7 | 25 | 112 | 11 |
| | B | — | — | — | — | — | — |
| Breakdown | Cellulose | 90 | 70 | 50.1 | 30 | 90 | 100 |
| | Ionic compound A | 10 | 30 | 49.9 | 70 | 10 | — |
| | B | — | — | — | — | — | — |
| | C | — | — | — | — | — | — |
| Existence ratio of cellulose of 2 μm or less (%) | | 25.6 | 35.4 | 48.3 | — | 14.4 | 4.6 |
| Areas of aggregates of cellulose (μm²) | Maximum value | 15578 | 14480 | 7231 | — | 25411 | 144374 |
| | Minimum value | 505 | 502 | 507 | — | 501 | 504 |
| Appearance of molded article (existence or non-existence of fiber aggregate) | | None | None | None | — | Exists | Exists |

TABLE 7

| Composition | | Example 37 | Example 38 | Example 39 | Example 40 | Example 41 | Example 42 | Example 43 | Example 44 | Example 45 |
|---|---|---|---|---|---|---|---|---|---|---|
| Thermoplastic resin | A | 78 | — | 99.8 | — | 98 | 78 | 78 | 100 | 100 |
| | B | 22 | 100 | 0.2 | 100 | 2 | 22 | 22 | — | — |
| | C | — | — | — | — | — | — | — | — | — |

TABLE 7-continued

| Composition | | Example 37 | Example 38 | Example 39 | Example 40 | Example 41 | Example 42 | Example 43 | Example 44 | Example 45 |
|---|---|---|---|---|---|---|---|---|---|---|
| Cellulose composition | A | 11 | 100 | 100 | 100 | 1.2 | 11 | 11 | 11 | — |
| | B | — | — | — | — | — | — | — | — | 11 |
| Breakdown Cellulose | | 90 | 90 | 99.9 | 50.1 | 90 | 90 | 90 | 90 | 90 |
| Ionic compound | A | 10 | 10 | 0.1 | 49.9 | 10 | — | — | 10 | 10 |
| | B | — | — | — | — | — | 10 | — | — | — |
| | C | — | — | — | — | — | — | 10 | — | — |
| Existence ratio of cellulose of 2 μm or less (%) | | 22.9 | 22 | 17.9 | 37.8 | 23.7 | 18.8 | 20.9 | 16.8 | 16.1 |
| Areas of aggregates of cellulose (μm$^2$) | Maximum value | 16993 | 18897 | 19121 | 5798 | 15911 | 17111 | 16143 | 16555 | 17530 |
| | Minimum value | 504 | 501 | 503 | 503 | 517 | 505 | 504 | 502 | 503 |
| Appearance of molded article (existence or non-existence of fiber aggregate) | | None | None | None | None | None | None | None | None | None |

TABLE 8

| Composition | | Example 46 | Example 47 | Example 48 | Comparative Example 10 | Comparative Example 11 | Comparative Example 12 |
|---|---|---|---|---|---|---|---|
| Thermoplastic resin | A | 74.3 | 72 | 66.7 | 50 | 100 | 100 |
| | B | — | — | — | 50 | — | — |
| | C | 25.7 | 28 | 33.3 | — | — | — |
| Cellulose composition | A | 28.6 | 40 | 66.7 | 25 | 112 | 11 |
| | B | — | — | — | — | — | — |
| Breakdown Cellulose | | 90 | 70 | 50.1 | 30 | 90 | 100 |
| Ionic compound | A | 10 | 30 | 49.9 | 70 | 10 | — |
| | B | — | — | — | — | — | — |
| | C | — | — | — | — | — | — |
| Existence ratio of cellulose of 2 μm or less (%) | | 25.6 | 35.4 | 48.3 | — | 14.4 | 4.6 |
| Areas of aggregates of cellulose (μm$^2$) | Maximum value | 15578 | 14480 | 7231 | — | 25411 | 144374 |
| | Minimum value | 505 | 502 | 507 | — | 501 | 504 |
| Appearance of molded article (existence or non-existence of fiber aggregate) | | None | None | None | — | Exists | Exists |

TABLE 9

| Composition | | Example 49 | Example 50 | Example 51 | Example 52 | Example 53 | Example 54 | Example 55 | Example 56 | Example 57 |
|---|---|---|---|---|---|---|---|---|---|---|
| Thermoplastic resin | A | 78 | — | 99.8 | — | 98 | 78 | 78 | 100 | 100 |
| | B | 22 | 100 | 0.2 | 100 | 2 | 22 | 22 | — | — |
| | C | — | — | — | — | — | — | — | — | — |
| Cellulose composition | A | 11 | 100 | 100 | 100 | 1.2 | 11 | 11 | 11 | — |
| | B | — | — | — | — | — | — | — | — | 11 |
| Breakdown Cellulose | | 90 | 90 | 99.9 | 50.1 | 90 | 90 | 90 | 90 | 90 |
| Ionic compound | A | 10 | 10 | 0.1 | 49.9 | 10 | — | — | 10 | 10 |
| | B | — | — | — | — | — | 10 | — | — | — |
| | C | — | — | — | — | — | — | 10 | — | — |
| Existence ratio of cellulose of 2 μm or less (%) | | 22.9 | 22 | 17.9 | 37.8 | 23.7 | 18.8 | 20.9 | 16.8 | 16.1 |
| Areas of aggregates of cellulose (μm$^2$) | Maximum value | 16993 | 18897 | 19121 | 5798 | 15911 | 17111 | 16143 | 16555 | 17530 |
| | Minimum value | 504 | 501 | 503 | 503 | 517 | 505 | 504 | 502 | 503 |
| Appearance of molded article (existence or non-existence of fiber aggregate) | | None | None | None | None | None | None | None | None | None |

TABLE 10

| Composition | | Example 58 | Example 59 | Example 60 | Comparative Example 13 | Comparative Example 14 | Comparative Example 15 |
|---|---|---|---|---|---|---|---|
| Thermoplastic resin | A | 74.3 | 72 | 66.7 | 50 | 100 | 100 |
| | B | — | — | — | 50 | — | — |
| | C | 25.7 | 28 | 33.3 | — | — | — |
| Cellulose composition | A | 28.6 | 40 | 66.7 | 25 | 112 | 11 |
| | B | — | — | — | — | — | — |
| Breakdown | Cellulose | 90 | 70 | 50.1 | 30 | 90 | 100 |
| | Ionic compound A | 10 | 30 | 49.9 | 70 | 10 | — |
| | B | — | — | — | — | — | — |
| | C | — | — | — | — | — | — |
| Existence ratio of cellulose of 2 μm or less (%) | | 25.6 | 35.4 | 48.3 | — | 14.4 | 4.6 |
| Areas of aggregates of cellulose (μm²) | Maximum value | 15578 | 14480 | 7231 | — | 25411 | 144374 |
| | Minimum value | 505 | 502 | 507 | — | 501 | 504 |
| Appearance of molded article (existence or non-existence of fiber aggregate) | | None | None | None | — | Exists | Exists |

TABLE 11

| Composition | | Example 8 | Comparative Example 3 |
|---|---|---|---|
| Thermoplastic resin | A | 100 | 100 |
| | B | — | — |
| Cellulose composition A | | 11 | 11 |
| Breakdown | Cellulose | 90 | 100 |
| | ionic compound A | 10 | — |
| | B | — | — |
| | C | — | — |
| Existence ratio of cellulose of 2 μm or less (%) | | 16.8 | 4.6 |
| Modulus of elasticity of cellulose (GPa) $E_1$ | | 4.73 | 4.12 |

As can be seen from Tables 1 to 10 described above, the existence ratio of the cellulose fiber having a short side length of 2 μm or less was 15% or more and the areas of the aggregates of cellulose were less than 20000 μm² for all of the thermoplastic resin compositions of Examples 1 to 60.

In contrast, the amount of the ionic compound compounded in the cellulose was too large in the thermoplastic resin compositions of Comparative Examples of 1, 4, 7, 10, and 13, and therefore the cellulose fibers dissolved. Therefore, observation of morphology as a dispersion was made impossible.

The amount of the cellulose was too large in the thermoplastic resin compositions of Comparative Examples of 2, 5, 8, 11, and 14, and therefore a state in which micronization was progressing was partially able to be ascertained, meanwhile cellulose aggregates the areas of which are 20000 μm² or more existed. Therefore, the existence ratio of the cellulose fiber having a short side length of 2 m or less was below 15%.

In the thermoplastic resin compositions of Comparative Examples 3, 6, 9, 12, and 15, the existence ratio of the cellulose fiber having a short side length of 2 μm or less was less than 15%, and the areas of the aggregates of cellulose were 20000 μm² or more. An effect of reinforcing a resin can be seen more strongly in the compositions in which 15% or more of the cellulose was micronized into 2 μm or less as in Example 8 shown as a representative in Table 11 described above. It is considered that this phenomenon is due to an improvement in the modulus of elasticity of the cellulose, the improvement brought about by the micronization of the cellulose.

With respect to the thermoplastic resin compositions of Examples 1 to 60, the modulus of elasticity is improved, the effect of reinforcing the thermoplastic resins is high, and the aggregate of the cellulose fiber does not exist in the molded article. Therefore, it is found that the thermoplastic resin compositions of Examples 1 to 60 are each useful as a cellulose-reinforced resin for the use especially for molded articles such as a lamp body, a speaker unit, a connection box, a connector, a pulley, and a film for a house.

The present disclosure has been described with reference to the above-described aspects, but these do not limit the disclosure unless otherwise specified, and the present disclosure should be broadly interpreted without departing from the spirit and scope of the disclosure described in the appended claims.

What is claimed is:

1. A molded article comprising a resin part formed with a thermoplastic resin composition, the thermoplastic resin composition comprising:
a thermoplastic resin;
cellulose; and
an ionic compound,
wherein a content of the cellulose is 5 to 100 parts by mass based on 100 parts by mass of the thermoplastic resin, a content of the ionic compound is 0.001 times or more and less than 1.000 times the content of the cellulose, the ionic compound is represented by any one of the following formulas (1a), (2b), and 2c:

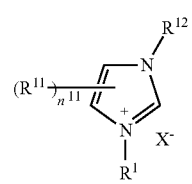

Formula (1a)

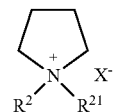

Formula (2b)

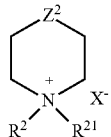

Formula (2c)

wherein $R^1$ and $R^2$ each independently represent an alkyl group, an alkenyl group, a cycloalkyl group, an aryl group, or a heterocyclic group; $X^-$ represents an anion; and $R^{11}$ and $R^{12}$ each independently represent a substituent; $n^{11}$ represents an integer of 0 to 3, and $n^{12}$ represents an integer of 0 to 5; when two or more $R^{11}$ exist, a plurality of $R^{11}$ are optionally the same with or different from each other, and at least two $R^{11}$ are optionally bonded to each other to form a ring;

$R^{21}$ is as defined for $R^2$; and $Z^2$ represents a single bond, a methylene group, —C(=O)—, —O—, —S—, —S(=O)—, —SO2-, —N(Rα1)-, or —N⁺(Rα1)(Rα2)-, wherein Rα1 represents a hydrogen atom or a substituent, Rα2 represents a substituent, and Rα1 and Rα2 are optionally bonded to each other to form a ring, and the molded article is a lamp body of a lighting appliance, a speaker unit, a connection box, a connector, or a pulley.

2. The molded article according to claim 1, wherein the $X^-$ is a halogen ion, a carboxylate anion, a sulfonate anion, a phosphate anion, a phosphonate anion, a dicyanamide ion, or a bis(trifluoromethanesulfonyl)imide ion.

3. The molded article according to claim 1, wherein the cellulose is a plant-derived, fibrous cellulose.

4. The molded article according to claim 1, wherein 15% or more of the cellulose has a short side length of 2 μm or less.

5. The molded article according to claim 1, wherein an area of a cellulose aggregate in the thermoplastic resin composition is less than 2000 μm².

6. The molded article of claim 1, wherein the cellulose is micronized, wherein the micronized cellulose has an aspect ratio of 5 or more, and wherein the aspect ratio is obtained by dividing an average length of the micronized cellulose by an average fiber diameter.

7. The molded article of claim 1, wherein the thermoplastic resin comprises a polyolefin resin, and wherein the polyolefin resin has a melt flow rate of 0.01 to 400 g/10 min at 190° C. under a load of 2.16 kg in accordance with JIS K 7210.

* * * * *